(12) United States Patent
Li et al.

(10) Patent No.: US 12,395,540 B2
(45) Date of Patent: Aug. 19, 2025

(54) MEDIA PACKET TRANSMISSION METHOD, APPARATUS, AND SYSTEM

(71) Applicant: HUAWEI TECHNOLOGIES CO., LTD., Guangdong (CN)

(72) Inventors: Yongcui Li, Beijing (CN); Qi Pan, Beijing (CN); Zhenglei Huang, Beijing (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 379 days.

(21) Appl. No.: 17/970,891

(22) Filed: Oct. 21, 2022

(65) Prior Publication Data

US 2023/0050923 A1 Feb. 16, 2023

Related U.S. Application Data

(63) Continuation of application No. PCT/CN2021/077698, filed on Feb. 24, 2021.

(30) Foreign Application Priority Data

Apr. 22, 2020 (CN) .......................... 202010322813.8

(51) Int. Cl.
*H04L 65/75* (2022.01)
*H04L 47/2483* (2022.01)
(Continued)

(52) U.S. Cl.
CPC .......... *H04L 65/75* (2022.05); *H04L 47/2483* (2013.01); *H04L 65/70* (2022.05); *H04L 65/80* (2013.01)

(58) Field of Classification Search
CPC ..... H04L 65/75; H04L 47/2483; H04L 65/70; H04L 65/80; H04L 47/2408; H04L 47/2425; H04W 28/24; H04W 28/06
See application file for complete search history.

(56) References Cited

U.S. PATENT DOCUMENTS

| 9,743,312 B1 | 8/2017 | Malhotra et al. |
| 2010/0195499 A1 | 8/2010 | Dattagupta et al. |

(Continued)

FOREIGN PATENT DOCUMENTS

| CN | 101232617 A | 7/2008 |
| CN | 101610257 A | 12/2009 |

(Continued)

OTHER PUBLICATIONS

8rd Generation Partnership Project; Technical Specification Group Services and System Aspects; Typical traffic characteristics of media services on 3GPP networks (Release 16), URL:https://tp.3gpp.org/tsg_sa/TSG_SA/TSGS_87E_Electronic/Docs/ SP-200048.zip 26925-200.doc [retrieved on Mar. 12, 2020] (Year: 2020).*

(Continued)

*Primary Examiner* — Cheikh T Ndiaye
(74) *Attorney, Agent, or Firm* — Fish & Richardson P.C.

(57) ABSTRACT

Embodiments of this application provide a media packet transmission method, an apparatus, and a system that relate to the field of communication technologies. In an example method, a transmit end network element obtains a correspondence between an encoding type and a quality of service (QoS) flow. The transmit end network element is a user plane network element or a terminal. The QoS flow is used to transmit a media packet whose encoding type is the encoding type corresponding to the QoS flow. The transmit end network element identifies an encoding type of a received media packet, and sends, based on the correspondence through a QoS flow corresponding to the encoding type of the media packet, the media packet carrying information associated with the encoding type to an access network element.

20 Claims, 7 Drawing Sheets

(51) Int. Cl.
  *H04L 65/70* (2022.01)
  *H04L 65/80* (2022.01)

(56) References Cited

U.S. PATENT DOCUMENTS

2014/0233413 A1\* 8/2014 Dahod .................... H04L 65/80
                                                                370/252
2018/0227606 A1   8/2018 Fryer et al.

FOREIGN PATENT DOCUMENTS

| CN | 102577272 A | 7/2012 |
| CN | 102905133 A | 1/2013 |
| CN | 110149657 A | 8/2019 |
| WO | 2017176247 A1 | 10/2017 |

OTHER PUBLICATIONS

LG Electronics Inc., "Intra-UE prioritization for critical packets within a RB/QoS flow," 3GPP TSG-RAN2 Meeting RAN2#104, R2-1818406, Spokane, USA, Nov. 12-16, 2018, 3 pages.

Apple, "PDCP Duplicatin Enhancement," 3GPP TSG-RAN WG2 Meeting #106, R2-1907171, Reno, USA, May 13-17, 2019, 3 pages.

3GPP TR 26.925 V2.0.0, "3rd Generation Partnership Project; Technical Specification Group Services and System Aspects; Typical traffic characteristics of media services on 3GPP networks (Release 16)," Mar. 2020, 31 pages.

Extended European Search Report in European Appln No. 21793341.5, dated Jun. 26, 2023, 14 pages.

3GPP TS 23.502 V16.4.0, "3rd Generation Partnership Project; Technical Specification Group Services and System Aspects; Procedures for the 5G System (5GS); Stage 2 (Release 16)," Mar. 2020, 582 pages.

ITU-T H.264, "Series H: Audiovisual and Multimedia Systems. Infrastructure of Audiovisual Services Coding of Moving Video. Advanced Video Coding for Generic Audiovisual Services," Jun. 2019, 836 pages.

3GPP TS 23.501 V16.4.0, "3rd Generation Partnership Project; Technical Specification Group Services and System Aspects; System Architecture for the 5G System (5GS); Stage 2 (Release 16)," Mar. 2020, 430 pages.

International Search Report and Written Opinion in International Appln. No. PCT/CN2021/077698, mailed on May 12, 2021, 16 pages (with English translation).

Ericsson, "Addition of MTSI Data Channel Media," 3GPP TSG-SA4 Meeting #107, S4-200265, Wroclaw, Poland, Jan. 20-24, 2020, 17 pages.

Office Action in Chinese Appln. No. 202010322813.8, dated Jan. 10, 2023, 5 pages.

\* cited by examiner

MEDIA PACKET TRANSMISSION METHOD, APPARATUS, AND SYSTEM

CROSS-REFERENCE TO RELATED APPLICATIONS

This application is a continuation of International Application No. PCT/CN2021/077698, filed on Feb. 24, 2021, which claims priority to Chinese Patent Application No. 202010322813.8, filed on Apr. 22, 2020. The disclosures of the aforementioned applications are hereby incorporated by reference in their entireties.

TECHNICAL FIELD

The present invention relates to the field of communication technologies, and in particular, to a media packet transmission method, an apparatus, and a system.

BACKGROUND

As the new media industry rapidly develops, services such as an ultra high-definition video and a virtual reality (VR) panoramic video are widely used. As a result, users have increasing requirements for a network bandwidth. When data of an existing media service is directly transmitted in a network, because a data volume of the media service is large, a requirement for a network bandwidth is high, transmission time is long, and user experience is poor. In a conventional technology, an encoding technology (for example, an H.264 encoding technology or an H.264 scalable video coding (SVC) technology) may be used to encode data of a media service to generate a media packet. This implements compression of the data of the media service to reduce a requirement of the data of the media service for the network bandwidth, shorten transmission time, and improve user experience.

Currently, media packets obtained through compression using the encoding technology correspond to different encoding types, and the media packets having different encoding types have a dependency relationship in a decoding process. For a receive end, when decoding a received media packet, the receive end can decode the media packet only after a media packet on which the media packet depends is received. For example, an example in which data of a media service is encoded using the H.264 encoding technology is used to obtain media packets whose encoding type is an I-frame, a P-frame, or a B-frame. The I-frame, the P-frame, and the B-frame have a dependency relationship. After a transmit end encodes the data of the media service using the H.264 encoding technology and sends the data to the receive end, the receive end may independently decode the I-frame. Decoding of the P-frame needs to depend on an I-frame or a P-frame before the P-frame, and decoding of the B-frame needs to depend on I-frames or P-frames before and after the B-frame.

In the conventional technology, the transmit end sends media packets to the receive end in a sending sequence of media packets. When decoding a media packet, if decoding of the current media packet needs to depend on other media packets, the receive end can decode the current media packet only after all media packets on which the current media packet depends are transmitted. For example, in the conventional technology, an example in which a media packet is encoded using the H.264 encoding technology is used. When an I-frame, a P-frame, and a B-frame are transmitted in a network, the I-frame, the P-frame, and the B-frame generally are successively transmitted in an arrival sequence of the frames. However, decoding of the P-frame needs to depend on the I-frame or the P-frame before the P-frame, and decoding of the B-frame needs to depend on the I-frames or the P-frames before and after the B-frame. If the frames are successively transmitted in the arrival sequence of the frames, the P-frame and the B-frame can be respectively decoded only after the I-frame or the P-frame on which the P-frame depends and the I-frames or the P-frames on which the B-frame depends are respectively transmitted. As a result, the user waits for a long time for buffering when playing the media packet.

SUMMARY

In view of this, an objective of embodiments of this application is to provide a media packet transmission method, an apparatus, and a system, to resolve a technical problem in a conventional technology that a user waits for a long time for buffering when playing a media packet.

According to a first aspect, a media packet transmission method is provided. The method includes: A transmit end network element obtains a correspondence between an encoding type and a QoS flow, where the transmit end network element is a user plane network element or a terminal, and the QoS flow is used to transmit a media packet whose encoding type is the encoding type corresponding to the QoS flow. The transmit end network element receives a media packet of a media service. The transmit end network element identifies an encoding type of the media packet. The transmit end network element sends, based on the correspondence through a QoS flow corresponding to the encoding type of the media packet, the media packet carrying information associated with the encoding type to an access network element.

Based on the first aspect, in this embodiment of this application, the transmit end network element may perform encoding type identification on the media packet, include the information associated with the encoding type in the media packet, and send the media packet to the access network element, so that the access network element can perform differentiated transmission on the media packet based on the information associated with the encoding type in the media packet. Therefore, time for decoding the media packet by a receive end network element can be shortened, time a user waits for buffering when playing the media packet can be shortened, and user experience can be improved.

In a possible design, with reference to the first aspect, the transmit end network element receives first indication information that indicates to perform encoding type identification on the media packet of the media service, and identifies the encoding type of the media packet based on the first indication information.

Based on this possible design, the transmit end network element may determine, based on the received first indication information, that the encoding type identification on the received media packet needs to be performed, and perform the encoding type identification on the received media packet in a subsequent data transmission process.

In a possible design, with reference to the first aspect or the possible design of the first aspect, the encoding type includes an I-frame, a P-frame, or a B-frame and/or the encoding type includes a base layer or an enhancement layer.

Based on this possible design, the encoding type may be the foregoing encoding type, or may be an encoding type corresponding to another encoding technology. This is not limited.

In a possible design, with reference to the first aspect or the possible designs of the first aspect, the transmit end network element performs encoding layer identification on the media packet to obtain the encoding type of the media packet; the transmit end network element performs application layer identification on the media packet to obtain second indication information that indicates the encoding type of the media packet; the transmit end network element performs transport layer identification on the media packet to obtain second indication information that indicates the encoding type of the media packet; or the transmit end network element performs network layer identification on the media packet to obtain second indication information that indicates the encoding type of the media packet.

Based on this possible design, the transmit end network element may obtain the encoding type of the media packet in any one of the foregoing manners. This provides a feasible solution for the transmit end network element to perform the encoding type identification on the media packet to obtain the encoding type of the media packet.

In a possible design, with reference to the first aspect or the possible designs of the first aspect, when different encoding types correspond to different QoS flows, the information associated with the encoding type includes an identifier of the QoS flow corresponding to the encoding type when the transmit end network element performs the encoding layer identification on the media packed; or the information associated with the encoding type includes an identifier of a QoS flow corresponding to the encoding type indicated by the second indication information when the transmit end network element performs the application layer/transport layer/network layer identification on the media packet.

Based on this possible design, when the different encoding types correspond to the different QoS flows, the identifier of the QoS flow may be used as the information associated with the encoding type, so that the access network element performs the differentiated transmission on the received media packet based on the identifier of the QoS flow. Therefore, the time for decoding the media packet by the receive end network element can be shortened, the time the user waits for buffering when playing the media packet can be shortened, and user experience can be improved.

In a possible design, with reference to the first aspect or the possible designs of the first aspect, when different encoding types correspond to a same QoS flow, the information associated with the encoding type includes third indication information that indicates the encoding type of the media packet when the transmit end network element performs the encoding layer identification on the media packet; or the information associated with the encoding type includes the second indication information when the transmit end network element performs the application layer/transport layer/network layer identification on the media packet.

Based on this possible design, when the different encoding types correspond to the same QoS flow, the second indication information or the third indication information that indicates the encoding type of the media packet may be carried in the media packet, so that the access network element determines the encoding type of the media packet based on the second indication information or the third indication information and performs the differentiated transmission on the different encoding types. Therefore, the time for decoding the media packet by the receive end network element can be shortened, the time the user waits for buffering when playing the media packet can be shortened, and user experience can be improved.

In a possible design, with reference to the first aspect or the possible designs of the first aspect, the third indication information is located at a GTP-U layer or a PDCP layer of the media packet.

Based on this possible design, when the transmit end network element is the user plane network element, the third indication information is located at the GTP-U layer; or when the transmit end network element is the terminal, the third indication information is located at the PDCP layer.

In a possible design, with reference to the first aspect or the possible designs of the first aspect, when different encoding types correspond to a same QoS flow, the information associated with the encoding type includes fourth indication information that indicates a priority corresponding to the encoding type of the media packet when the transmit end network element performs the encoding layer identification on the media packet; or the information associated with the encoding type includes fourth indication information associated with the second indication information when the transmit end network element performs the application layer/transport layer/network layer identification on the media packet, where the fourth indication information indicates a priority corresponding to the encoding type of the media packet.

Based on this possible design, when the different encoding types correspond to the same QoS flow, the fourth indication information may be carried in the media packet, so that the access network element determines the priority corresponding to the encoding type of the media packet based on the fourth indication information and performs the differentiated transmission on the different encoding types based on the priority. Therefore, the time for decoding the media packet by the receive end network element can be shortened, the time the user waits for buffering when playing the media packet can be shortened, and user experience can be improved.

In a possible design, with reference to the first aspect or the possible designs of the first aspect, the transmit end network element receives the priority corresponding to the encoding type, and the transmit end network element determines the fourth indication information based on the encoding type of the media packet.

Based on this possible design, after performing the encoding type identification on the received media packet, the transmit end network element determines the fourth indication information based on a correspondence between the encoding type and the priority.

According to a second aspect, an embodiment of this application provides a communication apparatus. The communication apparatus may implement a function performed by the transmit end network element in the first aspect or the possible designs of the first aspect, and the function may be implemented by hardware executing corresponding software. The hardware or the software includes one or more modules corresponding to the function, for example, a receiving module, a processing module, and a sending module.

The receiving module is configured to obtain a correspondence between an encoding type and a QoS flow, where the transmit end network element is a user plane network element or a terminal, and the QoS flow is used to transmit a media packet whose encoding type is the encoding type corresponding to the QoS flow.

The receiving module is further configured to receive a media packet of a media service.

The processing module is configured to identify an encoding type of the media packet.

The sending module is configured to send, based on the correspondence through a QoS flow corresponding to the encoding type of the media packet, the media packet carrying information associated with the encoding type to an access network embodiment.

For a specific implementation of the communication apparatus, refer to a behavior function of the transmit end network element in the media packet transmission method provided in any one of the first aspect or the possible designs of the first aspect. Based on the communication apparatus in the second aspect, the transmit end network element may perform encoding type identification on the media packet, include the information associated with the encoding type in the media packet, and send the media packet to the access network element, so that the access network element can perform differentiated transmission on the media packet based on the information associated with the encoding type in the media packet. Therefore, time for decoding the media packet by a receive end network element can be shortened, time a user waits for buffering when playing the media packet can be shortened, and user experience can be improved.

In a possible design, with reference to the second aspect, the receiving module is further configured to receive first indication information that indicates to perform encoding type identification on the media packet of the media service, and the processing module is further configured to identify the encoding type of the media packet based on the first indication information.

Based on this possible design, the transmit end network element max determine, based on the received first indication information, that the encoding type identification on the received media packet needs to be performed, and perform the encoding type identification on the received media packet in a subsequent data transmission process.

In a possible design, with reference to the second aspect or the possible design of the second aspect, the encoding type includes an I-frame, a P-frame, or a B-frame and/or the encoding type includes a base layer or an enhancement layer.

Based on this possible design, the encoding type may be the foregoing encoding type, or may be an encoding type corresponding to another encoding technology. This is not limited.

In a possible design, with reference to the second aspect or the possible designs of the second aspect, the processing module is further configured to perform encoding layer identification on the media packet to obtain the encoding type of the media packet; the processing module is further configured to perform application layer identification on the media packet to obtain second indication information that indicates the encoding type of the media packet; the processing module is further configured to perform transport layer identification on the media packet to obtain second indication information that indicates the encoding type of the media packet; or the processing module is further configured to perform network layer identification on the media packet to obtain second indication information that indicates the encoding type of the media packet.

Based on this possible design, the transmit end network element may obtain the encoding type of the media packet in any one of the foregoing manners. This provides a feasible solution for the transmit end network element to perform the encoding type identification on the media packet to obtain the encoding type of the media packet.

In a possible design, with reference to the second aspect or the possible designs of the second aspect, when different encoding types correspond to different QoS flows, the information associated with the encoding type includes an identifier of the QoS flow corresponding to the encoding type when the transmit end network element performs the encoding layer identification on the media packet; or the information associated with the encoding type includes an identifier of a QoS flow corresponding to the encoding type indicated by the second indication information when the transmit end network element performs the application layer/transport layer/network layer identification on the media packet.

Based on this possible design, when the different encoding types correspond to the different QoS flows, the identifier of the QoS flow may be used as the information associated with the encoding type, so that the access network element performs the differentiated transmission on the received media packet based on the identifier of the QoS flow. Therefore, the time for decoding the media packet by the receive end network element can be shortened, the time the user waits for buffering when playing the media packet can be shortened, and user experience can be improved.

In a possible design, with reference to the second aspect or the possible design of the second aspect, when different encoding types correspond to a same QoS flow, the information associated with the encoding type includes third indication information that indicates the encoding type of the media packet when the transmit end network element performs the encoding layer identification on the media packet, or the information associated with the encoding type includes the second indication information when the transmit end network element performs the application layer/transport layer/network layer identification on the media packet.

Based on this possible design, when the different encoding types correspond to the same QoS flow, the second indication information or the third indication information that indicates the encoding type of the media packet may be carried in the media packet, so that the access network element determines the encoding type of the media packet based on the second indication information or the third indication information and performs the differentiated transmission on the different encoding types. Therefore, the time for decoding the media packet by the receive end network element can be shortened, the time the user waits for buffering when playing the media packet can be shortened, and user experience can be improved.

In a possible design, with reference to the second aspect or the possible designs of the second aspect, the third indication information is located at a GTP-U layer or a PDCP layer of the media packet.

Based on this possible design, when the transmit end network element is the user plane network element, the third indication information is located at the GTP-U layer; or when the transmit end network element is the terminal, the third indication information is located at the PDCP layer.

In a possible design, with reference to the second aspect or the possible designs of the second aspect, when different encoding types correspond to a same QoS flow, the information associated with the encoding type includes fourth indication information that indicates a priority corresponding to the encoding type of the media packet when the transmit end network element performs the encoding layer identification on the media packet; or the information associated with the encoding type includes fourth indication information associated with the second indication information when the transmit end network element performs the application layer/transport layer/network layer identification on the media packet, where the fourth indication information indicates a priority corresponding to the encoding type of the media packet.

Based on this possible design, when the different encoding types correspond to the same QoS flow, the fourth indication information may be carried in the media packet, so that the access network element determines the priority corresponding to the encoding type of the media packet based on the fourth indication information and performs the differentiated transmission on the different encoding types based on the priority. Therefore, the time for decoding the media packet by the receive end network element can be shortened, the time the user waits for buffering when playing the media packet can be shortened, and user experience can be improved.

In a possible design, with reference to the second aspect or the possible designs of the second aspect, the receiving module is further configured to receive the priority corresponding to the encoding type, and the processing module is further configured to determine the fourth indication information based on the encoding type of the media packet.

Based on this possible design, after performing the encoding identification on the received media packet, the transmit end network element determines the fourth indication information based on a correspondence between the encoding type and the priority.

According to a third aspect, a communication apparatus is provided. The communication apparatus may be a transmit end network element, or a chip or a system on chip in the transmit end network element. The communication apparatus may implement a function performed by the transmit end network element in the foregoing aspects or the possible designs, and the function may be implemented by hardware. In a possible design, the communication apparatus may include a transceiver and a processor. The transceiver and the processor may be configured to support the communication apparatus in implementing the function in any one of the first aspect or the possible designs of the first aspect. For example, the transceiver may be configured to obtain a correspondence between an encoding type and a QoS flow, where the QoS flow is used to transmit a media packet whose encoding type is the encoding type corresponding to the QoS flow. The transceiver may be further configured to receive a media packet of a media service. The processor may be configured to identify an encoding type of the media packet. The transceiver may be further configured to send, based on the correspondence through a QoS flow corresponding to the encoding type of the media packet, the media packet carrying information associated with the encoding type to an access network element. In another possible design, the communication apparatus may further include a memory. The memory is configured to store computer-executable instructions and data that are necessary for the communication apparatus. When the communication apparatus runs, the processor executes the computer-executable instructions stored in the memory, so that the communication apparatus performs the media packet transmission method according to any one of the first aspect or the possible designs of the first aspect.

For a specific implementation of the communication apparatus, refer to a behavior function of the transmit end network element in the media packet transmission method provided in any one of the first aspect or the possible designs of the first aspect.

According to a fourth aspect, a communication apparatus is provided. The communication apparatus includes one or more processors and one or more memories, the one or more memories are coupled to the one or more processors, and the one or more memories are configured to store computer program code or computer instructions. When the one or more processors execute the computer instructions, the communication apparatus is enabled to perform the media packet transmission method according to any one of the first aspect or the possible designs of the first aspect.

According to a fifth aspect, a computer-readable storage medium is provided. The computer-readable storage medium stores computer instructions or a program. When the computer instructions or the program is run on a computer, the computer is enabled to perform the media packet transmission method according to any one of the first aspect or the possible designs of the first aspect.

According to a sixth aspect, a computer program product including instructions is provided. When the computer program product runs on a computer, the computer is enabled to perform the media packet transmission method according to any one of the first aspect or the possible designs of the first aspect.

According to a seventh aspect, a chip system is provided. The chip system includes one or more processors and one or more memories, the one or more memories are coupled to the one or more processors, and the one or more memories store computer program code or computer instructions. When the one or more processors execute the computer program code or the computer instructions, the chip system is enabled to perform the media packet transmission method according to any one of the first aspect or the possible designs of the first aspect.

For technical effects achieved by any one of the design manners of the third aspect to the seventh aspect, refer to the technical effects achieved by any one of the possible designs of the first aspect and the second aspect. Details are not described again.

According to an eighth aspect, an embodiment of this application provides a media packet transmission method. The method includes: A session management network element receives an encoding type and a quality of service (QoS) parameter corresponding to the encoding type from a policy control network element. The session management network element sends the encoding type and an identifier of a quality of service (QoS) flow corresponding to the encoding type to a mobility management network element and/or a user plane network element based on the encoding type and the QoS parameter corresponding to the encoding type, where the identifier of the QoS flow identifies the QoS flow and the QoS flow is used to transmit a media packet of a media service.

Based on the eighth aspect, in this embodiment of this application, the session management network element may send the encoding type and the identifier of the QoS flow corresponding to the encoding type to the mobility management network element and/or the user plane network element, so that the user plane network element or a terminal sends a media packet with the encoding type to an access network element through the QoS flow corresponding to the encoding type. As a result, the access network element performs differentiated transmission on the media packet. Therefore, time for decoding the media packet by a receive end network element can be shortened, time a user waits for buffering when playing the media packet can be shortened, and user experience can be improved.

In a possible design, with reference to the eighth aspect, the session management network element sends first indication information that indicates to perform encoding type identification on the media packet of the media service to the mobility management network element and/or the user plane network element.

Based on this possible design, the session management network element may send the first indication information to the mobility management network element and/or the user plane network element, so that the user plane network element or the terminal can perform the encoding type identification on a received media packet based on the first indication information.

In a possible design, with reference to the eighth aspect or the possible design of the eighth aspect, the session management network element sends a priority corresponding to the encoding type to the mobility management network element and/or the user plane network element.

Based on this possible design, the session management network element may send the priority corresponding to the encoding type to the mobility management network element and/or the user plane network element, so that the user plane network element or the terminal includes the priority corresponding to the encoding type in the media packet with the encoding type, and sends the media packet to the access network element. As a result, the access network element performs the differentiated transmission on the media packet based on the priority. Therefore, the time for decoding the media packet by the receive end network element can be shortened, the time the user waits for buffering when playing can be shortened, and user experience can be improved.

According to a ninth aspect, an embodiment of this application provides a communication apparatus. The communication apparatus may implement a function performed by the session management network element in the eighth aspect or the possible designs of the eighth aspect, and the function may be implemented by hardware executing corresponding software. The hardware or the software includes one or more modules corresponding to the function, for example, a receiving module and a sending module.

The receiving module is configured to receive an encoding type and a quality of service (QoS) parameter corresponding to the encoding type from a policy control network element.

The sending module is configured to send the encoding type and an identifier of a quality of service (QoS) flow corresponding to the encoding type to a mobility management network element and/or a user plane network element based on the encoding type and the QoS parameter corresponding to the encoding type, where the identifier of the QoS flow identifies the QoS flow, and the QoS flow is used to transmit a media packet of a media service.

For a specific implementation of the communication apparatus, refer to a behavior function of the session management network element in the media packet transmission method provided in any one of the eighth aspect or the possible designs of the eighth aspect. Based on the communication apparatus in the ninth aspect, the session management network element may send the encoding type and the identifier of the QoS flow corresponding to the encoding type to the mobility management network element and/or the user plane network element, so that the user plane network element or a terminal sends a media packet with the encoding type to an access network element through the QoS flow corresponding to the encoding type. As a result, the access network element performs differentiated transmission on the media packet. Therefore, time for decoding the media packet by a receive end network element can be shortened, time a user waits for buffering when playing the media packet can be shortened, and user experience can be improved.

In a possible design, with reference to the ninth aspect, the sending module is further configured to send first indication information that indicates to perform encoding type identification on the media packet of the media service to the mobility management network element and/or the user plane network element.

Based on this possible design, the session management network element may send the first indication information to the mobility management network element and/or the user plane network element, so that the user plane network element or the terminal can perform the encoding type identification on a received media packet based on the first indication information.

In a possible design, with reference to the ninth aspect or the possible design of the ninth aspect, the sending module is further configured to send a priority corresponding to the encoding type to the mobility management network element and/or the user plane network element.

Based on this possible design, the session management network element may send the priority corresponding to the encoding type to the mobility management network element and/or the user plane network element, so that the user plane network element or the terminal includes the priority corresponding to the encoding type in the media packet with the encoding type, and sends the media packet to the access network element. As a result, the access network element performs the differentiated transmission on the media packet based on the priority. Therefore, the time for decoding the media packet by the receive end network element can be shortened, the time the user waits for buffering when playing the media packet can be shortened, and user experience can be improved.

According to a tenth aspect, a communication apparatus is provided. The communication apparatus may be a session management network element, or a chip or a system on chip in the session management network element. The communication apparatus may implement a function performed by the session management network element in the foregoing aspects or the possible designs, and the function may be implemented by hardware. In a possible design, the communication apparatus may include a transceiver. The transceiver may be configured to support the communication apparatus in implementing the function in any one of the eighth aspect or the possible designs of the eighth aspect. For example, the transceiver may be configured to receive an encoding type and a quality of service (QoS) parameter corresponding to the encoding type from a policy control network element. The transceiver may be further configured to send the encoding type and an identifier of a quality of service (QoS) flow corresponding to the encoding type to a mobility management network element and/or a user plane network element based on the encoding type and the QoS parameter corresponding to the encoding type, where the identifier of the QoS flow identifies the QoS flow and the QoS flow is used to transmit a media packet of a media service. In another possible design, the communication apparatus may further include a memory. The memory is configured to store computer-executable instructions and data that are necessary for the communication apparatus. When the communication apparatus runs, the processor executes the computer-executable instructions stored in the memory, so that the communication apparatus performs the media packet transmission method according to any one of the eighth aspect or the possible designs of the eighth aspect.

For a specific implementation of the communication apparatus, refer to a behavior function of the session management network element in the media packet transmission method provided in any one of the eighth aspect or the possible designs of the eighth aspect.

According to an eleventh aspect, a communication apparatus is provided. The communication apparatus includes one or more processors and one or more memories, the one or more memories are coupled to the one or more processors, and the one or more memories are configured to store computer program code or computer instructions. When the one or more processors execute the computer instructions, the communication apparatus is enabled to perform the media packet transmission method according to any one of the eighth aspect or the possible designs of the eighth aspect.

According to a twelfth aspect, a computer-readable storage medium is provided. The computer-readable storage medium stores computer instructions or a program. When the computer instructions or the program is run on a computer, the computer is enabled to perform the media packet transmission method according to any one of the eighth aspect or the possible designs of the eighth aspect.

According to a thirteenth aspect, a computer program product including instructions is provided. When the computer program product runs on a computer, the computer is enabled to perform the media packet transmission method according to any one of the eighth aspect or the possible designs of the eighth aspect.

According to a fourteenth aspect, a chip system is provided. The chip system includes one or more processors and one or more memories, the one or more memories are coupled to the one or more processors, and the one or more memories store computer program code or computer instructions. When the one or more processors execute the computer program code or the computer instructions, the chip system is enabled to perform the media packet transmission method according to any one of the eighth aspect or the possible designs of the eighth aspect.

For technical effects achieved by any one of the design manners of the tenth aspect to the fourteenth aspect, refer to the technical effects achieved by any one of the possible designs of the eighth aspect and the ninth aspect. Details are not described again.

According to a fifteenth aspect, a communication system is provided. The communication system includes the communication apparatus according to the second aspect or the third aspect and the communication apparatus according to the ninth aspect or the tenth aspect.

DESCRIPTION OF EMBODIMENTS

Figure 1A:
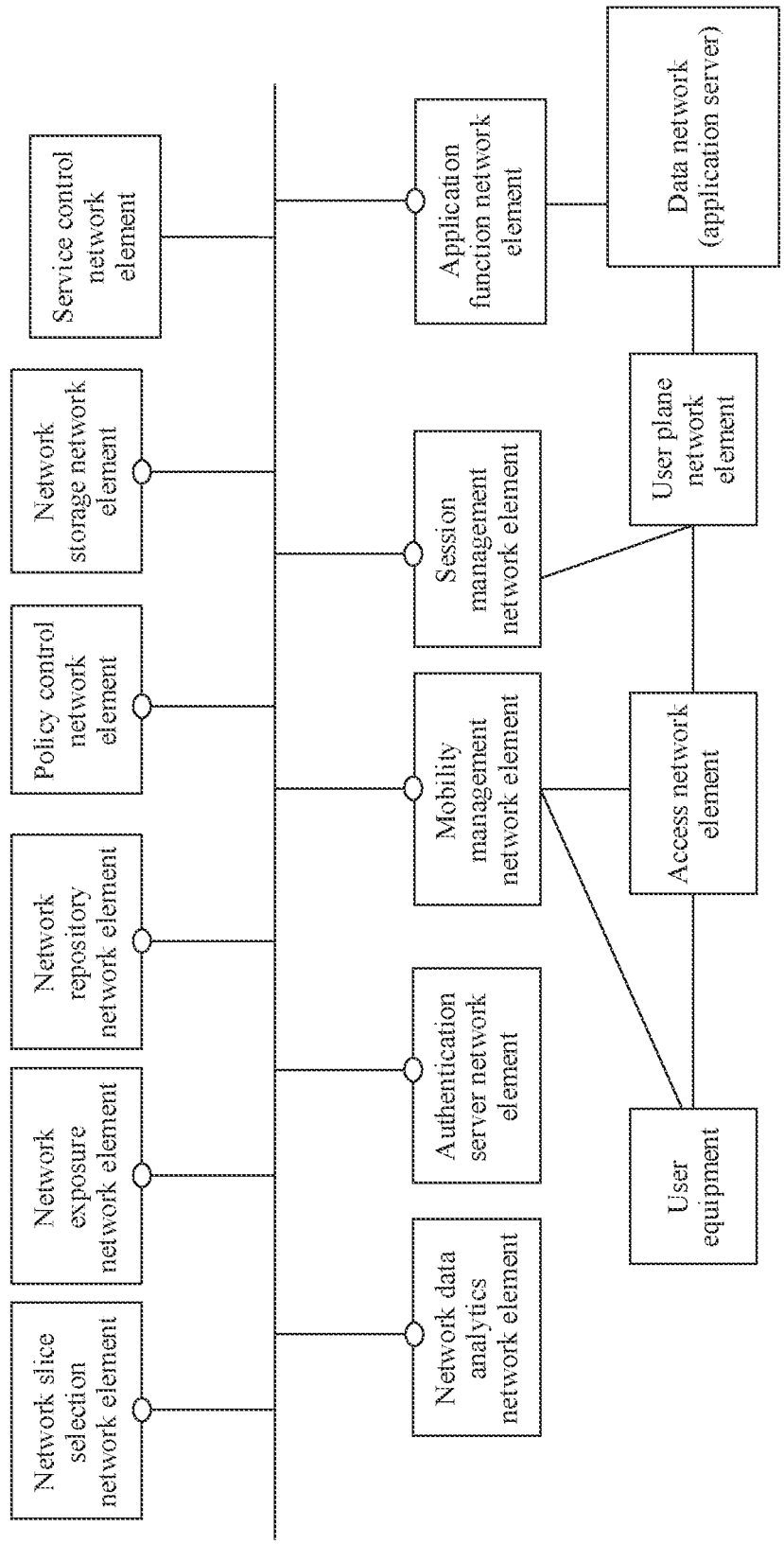
FIG. 1a is a schematic diagram of a communication system according to an embodiment of this application.

Currently, in a conventional technology, when media packets are transmitted, a transmit end successively sends the media packets to a receive end in an arrival sequence of the media packets. When decoding the media packets, if decoding of a current media packet needs to depend on other media packets, the receive end can decode the current media packet only after all media packets on which the current media packet depends are transmitted. As a result, a user waits for a long time for buffering when playing the media packets.

To resolve this problem, embodiments of this application provide a media packet transmission method. A transmit end network element may perform encoding type identification on a received media packet of a media service, include information associated with an encoding type in the media packet, and send the media packet to an access network element through a QoS flow corresponding to the encoding type. Compared with the conventional technology in which the transmit end network element successively sends the media packets to a receive end network element in the arrival sequence of the media packets, in embodiments of this application, the transmit end network element may perform the encoding type identification on the media packet, include the information associated with the encoding type in the media packet, and send the media packet to the access network element, so that the access network element can perform differentiated transmission on the media packet based on the information associated with the encoding type in the media packet. Therefore, time for decoding the media packet by a receive end network element can be shortened, time a user waits for buffering when playing the media packet can be shortened, and user experience can be improved.

The following describes implementations of embodiments of this application in detail with reference to the accompanying drawings in this specification.

A media packet transmission method provided in embodiments of this application may be used in any communication system. The communication system may be a 3rd generation partnership project (third generation partnership project 3GPP) communication system, for example, a long term evolution (LTE) system; or may be a 5th generation (fifth generation, 5G) mobile communication system, a new radio (NR) system, an NR V2X system, or another next-generation communication system; or may be a non-3GPP communication system. This is not limited. The media packet transmission method provided in embodiments of this application may be applied to various communication scenarios, for example, may be applied to one or more of the following communication scenarios: enhanced mobile broadband (eMBB), ultra-reliable low-latency communication (URLLC), machine type communication (MTC), massive machine-type communications (mMTC), device-to-device (D2D), vehicle to everything (V2X), vehicle-to-vehicle (V2V), and internet of things (IoT). The following uses FIG. 1a as an example to describe a media packet transmission method according to an embodiment of this application.

FIG. 1a is a schematic diagram of a communication system according to an embodiment of this application. As shown in FIG. 1a, the communication system may include at least one user equipment, an access network element, a mobility management network element, a session management network element, a policy control network element, a user plane network element, an application function network element, and a data network (DN).

The user equipment in FIG. 1a may be located in a cell coverage area of the access network element. The user equipment may perform air interface communication with the access network element over an uplink (UL). In a UL direction, the user equipment sends data to the access network element, the access network element forwards the received data to a core network element, and the core network element processes the data and sends the processed data to an application server through an N6 interface. In a DL direction, the application server sends downlink data to the core network element, the core network element processes the data and sends the processed data to an access network element through an N3 interface, and the access network element processes the data and sends the processed data to the user equipment through an air interface. For example, the user equipment sends uplink data to the access network element in the UL direction through a physical uplink shared channel (MISCH), the access network element forwards the received uplink data to the core network element, and the core network element processes the uplink data and sends the processed uplink data to the application server through the N6 interface. The access network element that forwards the uplink data from the user equipment to the core network element and the access network element that forwards the downlink data from the core network element to the user equipment may be a same access network element, or may be different access network elements.

Alternatively, the user equipment may communicate with the core network element through a specific interface. For example, the user equipment may communicate, through an N1 interface, with an access and mobility management network element belonging to the core network element.

After accessing a network, the user equipment may establish a protocol data unit (PDU) session, access an external data network (DN) by using the PDU session, and interact with an application server deployed in the DN. In FIG. 1a, for different DNs accessed by a user, the network may select, according to a network policy, a user plane network element accessing the DN as an anchor of the PDU session, namely, a protocol data unit session anchor (PDU session anchor, PSA), to access the application server through an N6 interface of the PSA. Application servers of a same application may be deployed at a plurality of locations. The network may select, based on an access location of the user equipment, a PSA that is close to the user equipment and that can support the user equipment in accessing the DN, to reduce route recurvation and a network delay.

The user equipment (UE) in FIG. 1a may be referred to as a terminal, a mobile station (MS), a mobile terminal (MT), or the like. Specifically, the user equipment in FIG. 1a, may be a mobile phone, a tablet computer, or a computer having a wireless transceiver function. Alternatively, the user equipment may be a virtual reality (YR) terminal, an augmented reality (AR) terminal, a wireless terminal in industrial control, a wireless terminal in self-driving, a wireless terminal in telemedicine, a wireless terminal in a smart grid, a wireless terminal in a smart city, a wireless terminal in a smart home, a vehicle-mounted terminal, a vehicle having a vehicle-to-vehicle (V2V) communication capability, an intelligent and connected vehicle, an unmanned aerial vehicle having a UAV-to-UAV (U2U) communication capability, or the like. This is not limited.

The access network element in FIG. 1a may be any device having a wireless transceiver function, and is mainly configured to implement functions such as a radio physical control function, resource scheduling and radio resource management, radio access control, and mobility management. Specifically, the access network element may be a device supporting wired access, or may be a device supporting wireless access. For example, the access network element may be an access network (AN) device/a radio access network (RAN) device, where the AN/RAN includes a plurality of 5G-AN/5G-RAN nodes. The 5G-AN/5G-RAN node may be an access point (AP), a NodeB (NB), an enhanced NodeB (eNB), a next-generation NodeB (NR NodeB, gNB), a transmission reception point (TRP), a transmission point (TP), another access node, or the like.

The mobility management network element in FIG. 1a is mainly responsible for work such as access authentication and mobility management of the user equipment, and signaling interaction between functional network elements, for example, managing a registration status of a user, a connection status of the user, user registration and network access, tracking area update, user authentication during cell handover, and key security.

The session management network element in FIG. 1a may be referred to as a session management function, a multicast/broadcast service management function (MB-SMF), a multicast session management network element, or the like. This is not limited. The session management network element is mainly configured to implement a user plane transmission logical channel, for example, a session management function such as establishment, release, and modification of a packet data unit (PDU) session.

The policy control network element in FIG. 1a may be configured to provide a policy for the mobility management network element and the session management network element, for example, a quality of service policy.

The user plane network element in FIG. 1a may be referred to as a PDU session anchor (PSF), a user plane function, or a multicast/broadcast user plane function (MB-IPF). The user plane network element may be used as an anchor on a user plane transmission logical channel, and is mainly configured to complete functions such as routing and forwarding of user plane data. For example, the user plane network element establishes a channel (namely, the user plane transmission logical channel) to a terminal, forwards a data packet between the terminal and a DN on the channel, and is responsible for data packet filtering, data forwarding, rate control, generation of charging information, and the like for the terminal. A multicast/broadcast (MB) service controller has service management functions such as group management, security management, and service announcement.

The application function network element in FIG. 1a is mainly an intermediate functional entity that provides interaction between an application server and a network element in a core network. The application server may use the application function network element to dynamically control quality of service and charging of a network, ensure an SLA requirement, obtain running information of a network element in the core network, and the like. In embodiments of this application, the application function network element may be a functional entity deployed by an operator, or may be a functional entity deployed by a service provider. The service provider may be a third-party service provider, or may be a service provider inside the operator. This is not limited. The application function network element and the application server may be deployed together or separately. A specific deployment manner of the application function network element and the application server is not limited in this application.

The data network (DN) in FIG. 1a may be an operator network that provides a data transmission service for a user, for example, may be an operator network that provides an IP multimedia service (IMS) for the user. An application server (AS) may be deployed in the DN, and the application server may provide the data transmission service for the user.

It should be noted that the terminal, the access network element, and the core network element in embodiments of this application each may be one or more chips, or may be a system on chip (SoC), or the like. FIG. 1a is merely an example diagram, and a quantity of devices included in FIG. 1a is not limited. In addition, the communication system may further include other devices in addition to the devices shown in FIG. 1a. Names of the devices and the links in FIG. 1a are not limited. In addition to the names shown in FIG. 1a, the devices and the links may have other names. In addition to the network elements shown in FIG. 1a, the network shown in FIG. 1a may further include a network slice selection network element, a network repository network element, an authentication server network element, a network storage network element, a network data analytics network element, a network exposure network element, and the like. This is not limited.

Specifically, the communication system shown in FIG. 1a may be a 3rd generation partnership project (3GPP) communication system, for example, a long term evolution (LIE) communication system, a 4th generation (4G) communication system, a 5th generation (5(3) communication system or a new radio (NR) communication system, or may be a non-3GPP communication system. This is not limited.

Figure 1B:
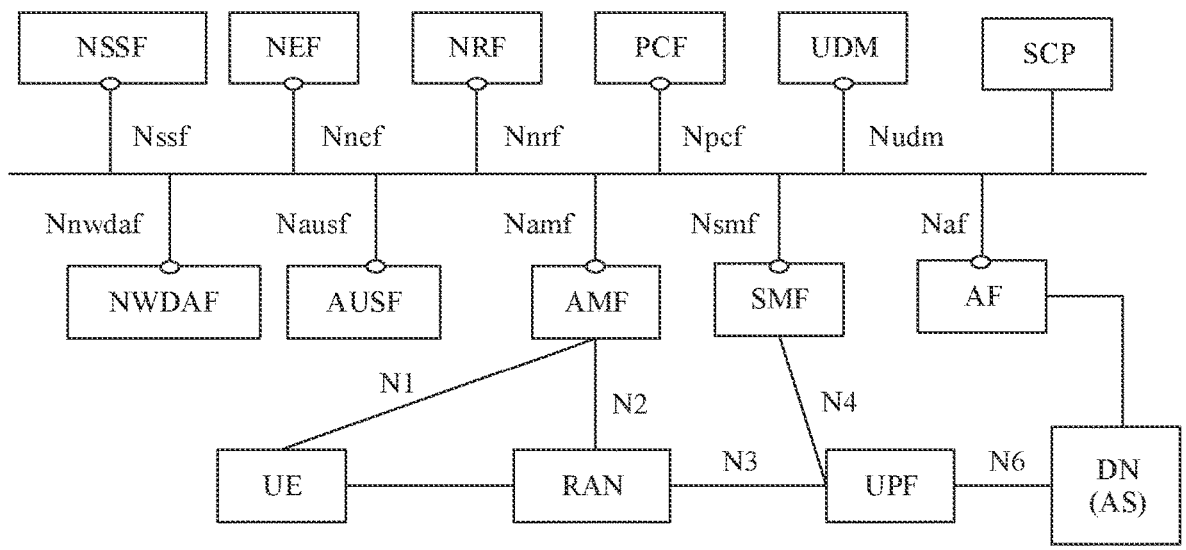
FIG. 1B is a schematic diagram of a 5G communication system according to an embodiment of this application.

For example, the communication system shown in FIG. 1a is a 5G communication system. In FIG. 1b, a network element or an entity corresponding to the access network element may be a radio access network (RAN) in the 5G communication system. A network element or an entity corresponding to the mobility management network element may be an access and mobility management function (AMF) in the 5G communication system. A network element or an entity corresponding to the session management network element may be a session management function (SMF) in the 5G communication system. The policy control network element may be a policy control function (PCF) in the 5G communication system. A network element or an entity corresponding to the user plane network element may be a user plane function (UPF) in the 5G communication system. A network element or an entity corresponding to the application function network element may be an application function (AF) in the 5G communication system. A network element or an entity corresponding to the network slice selection network element may be a network slice selection function (NSSF) in the 5G communication system. A network element or an entity corresponding to the network repository network element may be a network repository function (NRF) in the 5G communication system. A network element or an entity corresponding to the authentication server network element may be an authentication server function (AUS') in the 5G communication system. A network element or an entity corresponding to the network storage network element may be an NRF, a unified data repository (UDR), or a unified data management (UDM) in the 5G communication system. A network element or an entity corresponding to the network data analytics network element may be a network data analytics function (NWDAF) in the 5G communication system. A network element or an entity corresponding to the network exposure network element may be a network exposure function (NEF) in the 5G communication system. A network element or an entity corresponding to a service control network element may be a service control point (SCP) in the 5G communication system, and the like.

As shown in FIG. 1b, a terminal communicates with the AMF through a next generation (N) 1 interface (N1 for short), the RAN device communicates with the AMF through an N2 interface (N2 for short), the RAN device communicates with the UPF through an N3 interface (N3 for short), and the UPF communicates with an application server in a DN through an N6 interface. Core network elements may communicate with each other through service-oriented interfaces. For example, the AMF may communicate with another core network element through an Namf interface. The SMF may communicate with another core network element through an Nsmf interface. The PCF may communicate with another core network element through an Npcf interface. The NSSF may communicate with another core network element through an Nnssf interface. The NEF may communicate with another core network element through an Nnef interface. The NRF may communicate with another core network element through an Nnrf interface. The UDM may communicate with another core network element through an Nudr interface. The NWDAF may communicate with another core network element through an Nnwdaf interface. The AUSF may communicate with another core network element through an Nausf interface.

Figure 2:
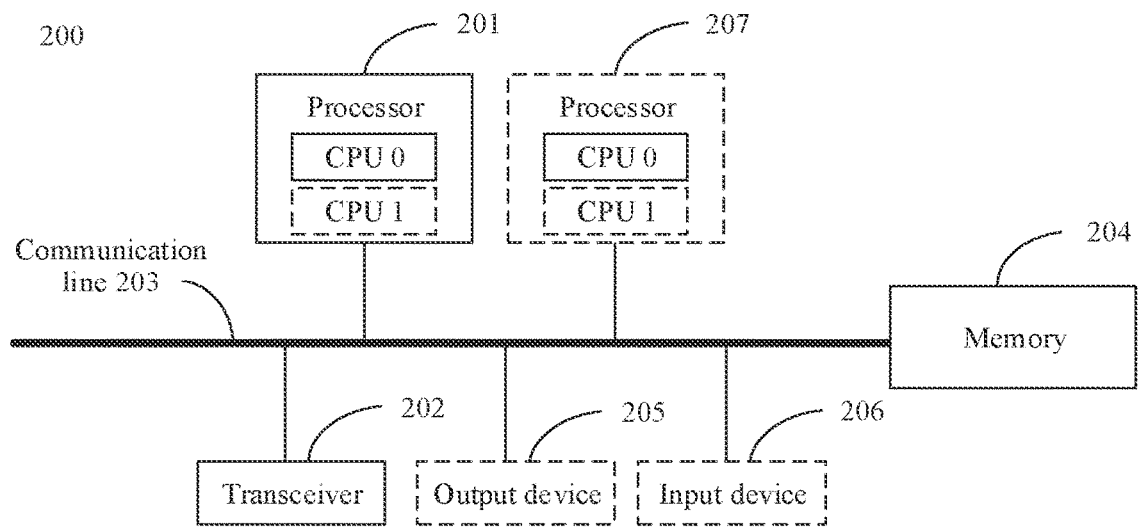
FIG. 2 is a diagram of a composition structure of a communication apparatus according to an embodiment of this application.

During specific implementation, in FIG. 1a, for example, each terminal, the access network element, and the core network element may use a composition structure shown in FIG. 2, or include components shown in FIG. 2. FIG. 2 is a schematic diagram of composition of a communication apparatus 200 according to an embodiment of this application. The communication apparatus 200 may be a terminal or a chip or a system on chip in the terminal, may be an access network element or a chip or a system on chip in the access network element, or may be a core network element or a chip or a system on chip in the core network element. As shown in FIG. 2, the communication apparatus 200 includes a processor 201, a transceiver 202, and a communication line 203.

Further, the communication apparatus 200 may further include a memory 204. The processor 201, the memory 204, and the transceiver 202 may be connected through the communication line 203.

The processor 201 is a central processing unit (CPU), a general-purpose processor, a network processor (NP), a digital signal processor (DSP), a microprocessor, a microcontroller, a programmable logic device (PLD), or any combination thereof. Alternatively, the processor 201 may be another apparatus having a processing function, for example, a circuit, a component, or a software module. This is not limited.

The transceiver 202 is configured to communicate with another device or another communication network. The another communication network may be the Ethernet, a radio access network (RAN), a wireless local area network (WLAN), or the like. The transceiver 202 may be a module, a circuit, a transceiver, or any apparatus that can implement communication.

The communication line 203 is configured to transmit information between the components included in the communication apparatus 200.

The memory 204 is configured to store instructions. The instructions may be a computer program.

The memory 204 may be a read-only memory (ROM) or another type of static storage device that can store static information and/or instructions may be a random access memory (RAM) or another type of dynamic storage device that can store information and/or instructions; or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or the like. This is not limited.

It should be noted that the memory 204 may exist independently of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to implement the media packet transmission method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device, for example, a keyboard, a mouse, a microphone, or a joystick, and the output device 205 is a device, for example, a display screen or a speaker.

It should be noted that the communication apparatus 200 may be a desktop computer, a portable computer, a network server, a mobile phone, a tablet computer, a wireless terminal, an embedded device, a chip system, or a device having a structure similar to that in FIG. 2. In addition, the composition structure shown in FIG. 3 does not constitute a limitation on the communication apparatus. In addition to the components shown in FIG. 2, the communication apparatus may include more or fewer components than those shown in the figure, some components may be combined, or different component arrangements may be used.

In embodiments of this application, the chip system may include a chip, or may include a chip and another discrete component.

In addition, mutual reference may be made to actions, terms, and the like in embodiments of this application. This is not limited. In embodiments of this application, names of messages exchanged between devices, names of parameters in the messages, or the like are merely examples. Another name may alternatively be used during specific implementation. This is not limited.

With reference to the communication system shown in FIG. 1a, the following describes the media packet transmission method provided in embodiments of this application. The transmit end network element may be any terminal or user plane network element in the communication system, and the access network element may be any access network element in the communication system. The transmit end network element, the access network element, the session management network element, the mobility management network element, and the policy control network element in the following embodiments may have the components shown in FIG. 2.

Figure 3:
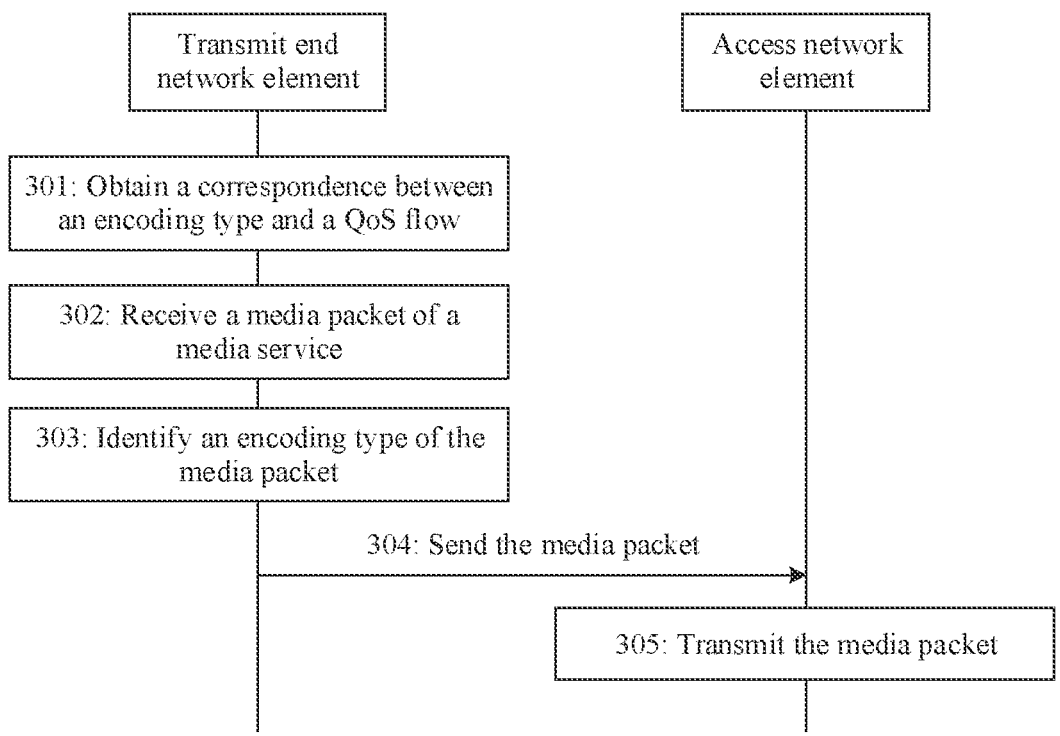
FIG. 3 is a flowchart of a media packet transmission method according to an embodiment of this application.

FIG. 3 is a flowchart of a media packet transmission method according to an embodiment of this application. As shown in FIG. 3, the method may include the following steps.

Step 301: A transmit end network element obtains a correspondence between an encoding type and a QoS flow.

The transmit end network element may be a user plane network element or a terminal. The terminal may be any terminal in the system shown in FIG. 1a. The user plane network element may be a user plane network element corresponding to a MU session established by the terminal, and may be an anchor of the PDU session established by the terminal. The terminal may send a media packet destined for an application server to the user plane network element through the PDU session, and the user plane network element sends the media packet to the application server. The user plane network element may send, to the terminal through the PDU session, a media packet delivered by the application server to the terminal. It should be noted that before this embodiment of this application is performed, the terminal has established the PDU session with reference to a conventional technology. Details are not described.

The encoding type may refer to a resolution type, a quality level type, a frame rate type, or the like corresponding to a media packet of a media service after the media packet of the media service is processed using an encoding technology. There may be a plurality of encoding types of a media service, and encoding technologies may include an H.264 encoding technology, an H.264 SVC encoding technology, a VP8 encoding technology, a VP9 encoding technology, another encoding technology, and the like. For example, when the H.264 encoding technology is used to encode the media packet of the media service, the encoding type of the media service may be an I-frame, a P-frame, or a B-frame. When the 11264 SVC encoding technology is used to encode the media packet of the media service, the encoding type of the media service may be a base layer or an enhancement layer. When the VP8 encoding technology or the VP9 encoding technology is used to encode the media packet of the media service, the encoding type of the media service may be a P-frame, a G-frame (golden frame), and an alternate reference frame (altref frame). In this embodiment of this application, another encoding technology may be used to encode the media packet of the media service, to obtain an encoding type corresponding to the another encoding technology, and the like. This is not limited.

In addition, an encoding type of the media packet may alternatively be determined based on a field of view of a video stream corresponding to the media service; or the encoding type of the media service may be determined based on an encoding technology corresponding to the media service. This is not limited.

For example, the encoding type of the media service may be determined as a foreground stream or a background stream based on the field of view of the video stream corresponding to the media service. For example, an encoding type of a media packet obtained after a video stream in a field of view range is encoded may be determined as the foreground stream, and an encoding type of a media packet obtained after a video stream in another background area outside the field of view range is encoded may be determined as the background stream.

For another example, the encoding technology of the media service includes the VP8 encoding mechanism and the VP9 encoding mechanism. It may be determined that the encoding type of the media service is VP8 or VP9. For example, it may be determined that an encoding type of a media packet obtained through encoding using the VP8 encoding technology is VP8, and an encoding type of a media packet obtained through encoding using the VP9 encoding technology is VP9.

In this embodiment of this application, to meet a QoS requirement of a media service, the encoding type may correspond to a QoS flow that supports transmission of a media packet with the encoding type, and the media packet is transmitted through the QoS flow. The QoS flow may be one or more QoS flows corresponding to the PDU session established by the terminal. The QoS flow may be used to transmit a media packet between the terminal and the user plane network element. A QoS parameter of the QoS flow meets a QoS requirement of the media packet transmitted on the QoS flow. For example, when establishing the PDU session for the terminal, a session management network element may establish a QoS flow corresponding to the encoding type; or after establishing the PDU session for the terminal, a session management network element modifies the PDU session, including modifying or adding a QoS flow of the PDU session, so that the modified or added QoS flow corresponds to the encoding type and meets a QoS requirement such as a transmission requirement of a media service with the encoding type. Specifically, for a process in which the session management network element determines the QoS flow corresponding to the encoding type, refer to the method shown in FIG. 4A and FIG. 4B.

A one-to-one correspondence manner or a many-to-one correspondence manner may be used between the encoding type and the QoS flow. This is not limited. It should be noted that a correspondence between the encoding type and the QoS flow may be alternatively described as a correspondence between the encoding type and an identifier of the QoS flow. The identifier of the QoS flow may be a quality of service flow identifier (quality of service flow identity, QFI), an allocation retention priority (ARP), a 5th-generation mobile network quality of service identifier (fifth-generation mobile networks quality of service identifier, 5QI), or the like. This is not limited.

In the many-to-one correspondence manner, a part of encoding types correspond to one QoS flow and the other part of encoding types correspond to another QoS flow. Alternatively, in the many-to-one correspondence manner, all encoding types may correspond to a same QoS flow.

An example in which the encoding type includes the I-frame, the P-frame, or the B-frame. The I-frame may correspond to a QoS flow 1, the P-frame corresponds to a QoS flow 2, and the B-frame corresponds to a QoS flow 3. Alternatively, the I-frame corresponds to a QoS flow 1, and the P-frame and the B-frame correspond to a QoS flow 2. Alternatively, the I-frame, the P-frame, and the B-frame all correspond to a QoS flow 1.

The correspondence between the encoding type and the QoS flow may be represented in an array form, may be represented in a table form, or may be represented in another form. This is not limited. It is assumed that the encoding type includes the I-frame, the P-frame, or the B-frame. The I-frame may correspond to the QoS flow 1, the P-frame corresponds to the QoS flow 2, and the B-frame corresponds to the QoS flow 3. For example, the correspondence between the encoding type and the QoS flow is represented in the array form. The correspondence between the encoding type and the QoS flow includes: (I-frame, QoS flow 1), (P-frame, QoS flow 2), and (B-frame, QoS flow 3). For example, the correspondence between the encoding type and the QoS flow is represented in the table form. The correspondence between the encoding type and the QoS flow may be that shown in Table 1.

TABLE 1

| I-frame | QoS flow 1 |
|---------|------------|
| P-frame | QoS flow 2 |
| B-frame | QoS flow 3 |

In a possible design, when the transmit end network element is the user plane network element, the user plane network element receives an encoding type of a media service and an identifier of a QoS flow corresponding to the encoding type that are sent by the session management network element, so that the user plane network element transmits a media packet with the encoding type to an access network element through the QoS flow corresponding to the encoding type.

In another possible design, when the transmit end network element is the terminal, the terminal receives, through a mobility management network element, an encoding type of a media service and an identifier of a QoS flow corresponding to the encoding type that are sent by the session management network element, so that the terminal transmits a media packet with the encoding type to an access network element through the QoS flow corresponding to the encoding type.

Step 302: The transmit end network element receives a media packet of a media service.

The media packet received by the transmit end is a media packet obtained after encoding using the encoding technology.

Optionally, when the transmit end network element is the user plane network element, the user plane network element receives a media packet sent by the application server. For example, the encoding technology is the H.264. The application server may encode the media packet of the media service using the H.264 encoding technology, to obtain a media packet whose encoding type is the I-frame, the P-frame, or the B-frame.

Further, the application server may further set second indication information for the media packet at an application layer, a transport layer, or a network layer, to indicate an encoding type of the media packet. That is, a packet header at an application layer, a transport layer, or a network layer of the media packet includes the second indication information.

The application server may set the second indication information for the media packet according to an application layer protocol. The application layer protocol may be a hypertext transfer protocol secure (HTTPS), a real-time streaming protocol (RTSP), or the like. This is not limited. Alternatively, the application server may set the second indication information for the media packet according to a transport layer protocol. The transport layer protocol may be a transmission control protocol (TCP), a multipath TCP protocol (multipath TCP, MPTCP), or the like. When a packet is transmitted between the user plane network element and the application server according to a tunneling protocol, the transport layer protocol may alternatively be a corresponding tunneling protocol. This is not limited. Alternatively, the application server may set the second indication information for the media packet according to a network layer protocol. The network layer protocol may be an internet protocol (IP) or the like. This is not limited.

Optionally, when the transmit end network element is the terminal, the terminal receives a media packet from the application layer.

Various applications (APPs) may be installed on the terminal. The APP may generate a media packet, and the terminal may obtain the media packet from the APP installed on the terminal. That is, the terminal receives the media packet from the application layer.

Step 303: The transmit end network element identifies the encoding type of the media packet.

For example, the transmit end network element may perform encoding type identification on the received media packet in any one of the following four manners, to obtain the encoding type of the media packet:

Manner 1: The transmit end may perform encoding layer identification on the media packet to obtain the encoding type of the media packet.

Manner 2: The transmit end network element may perform application layer identification on the media packet to obtain the second indication information, where the second indication information indicates the encoding type of the media packet.

Manner 3: The transmit end network element may perform transport layer identification on the media packet to obtain the second indication information, where the second indication information indicates the encoding type of the media packet.

Manner 4: The transmit end network element may perform network layer identification on the media packet to obtain the second indication information, where the second indication information indicates the encoding type of the media packet.

Optionally, the transmit end network element performs the encoding type identification on the received media packet based on received first indication information. The first indication information indicates to perform the encoding type identification on the media packet of the media service.

Specifically, when the transmit end network element is the user plane network element, the user plane network element may receive the first indication information sent by the session management network element. When the transmit end network element is the terminal, the terminal may receive, through the mobility management network element, the first indication information sent by the session management network element, or receive, through the access network element and the mobility management network element, the first indication information sent by the session management network element.

That the first indication information indicates to perform the encoding type identification on the media packet of the media service may specifically include: indicating to use the foregoing manner 1, manner 2, manner 3, or manner 4 to perform the encoding type identification on the media packet.

It should be noted that for a process in which the transmit end network element performs the encoding layer identification on the media packet to obtain the encoding type of the media packet, refer to the conventional technology. Details are not described. In addition, for a process of setting the second indication information at the application layer, the transport layer, or the network layer when the media packet is encoded, refer to a process of selling indication information at the application layer, the transport layer, or the network layer in the conventional technology. Details are not described.

Step 304: The transmit end network element sends the media packet to the access network element based on the correspondence obtained in step 301 through a QoS flow corresponding to the encoding type of the media packet. Correspondingly, the access network element receives the media packet.

The media packet may carry media data, and may further carry information associated with the encoding type. The information associated with the encoding type may indicate the encoding type of the media packet.

For example, the information associated with the encoding type may be one of the following four types of information:

(1) When different encoding types correspond to different QoS flows, the information associated with the encoding type may be an identifier of the QoS flow corresponding to the encoding type.

Because the different QoS flows correspond to different QoS parameters, such as a transmission priority, a bandwidth, and a delay, after receiving the media packet, the transmit end network element may include the identifier of the QoS flow corresponding to the identified encoding type in the media packet, and send the media packet to the access network element, so that the access network element performs priority-based transmission on the media packet based on the QoS flow corresponding to the media packet.

Optionally, when that the different encoding types correspond to the different QoS flows means that the encoding type of the media service is in a one-to-one correspondence with the QoS flow, the foregoing information associated with the encoding type is described in detail by using an example in which the encoding type includes the I-frame, the P-frame, or the B-frame, a QoS flow corresponding to the I-frame is a OFI 1, a QoS flow corresponding to the P-frame is a QFI 2, and a QoS flow corresponding to the B-frame is a 3.

When decoding received media packets, a receive end network element may independently decode the I-frame. Decoding of the P-frame needs to depend on an I-frame or a P-frame before the P-frame, and decoding of the B-frame needs to depend on I-frames or P-frames before and after the B-frame. Based on a decoding dependency, a transmission priority of the QFI 1 corresponding to the I-frame may be set to being high, a transmission prior4 of the QFI 2 corresponding to the P-frame may be set to being medium, and a transmission priority of the QFI 3 corresponding to the B-frame may be set to being low. In this way, after receiving media packets and performing the encoding type identification, the transmit end network element may include the QFI 1 in a media packet whose encoding type is the I-frame, include the QFI 2 in a media packet whose encoding type is the P-frame, and include the QFI 3 in a media packet whose encoding type is the B-frame. Therefore, after receiving the media packets, the access network element transmits, based on the transmission priority corresponding to the QFI 1, the media packet carrying the QFI 1, transmits, based on the transmission priority corresponding to the QFI 2, the media packet carrying the QFI 2, and transmits, based on the transmission priority corresponding to the QFI 3, the media packet carrying the QFI 3.

For example, the access network element successively receives a media packet 2 carrying the QFI 2, a media packet 3 carrying the QFI 3, and a media packet 1 carrying the QFI 1. The access network element may transmit the media packets based on transmission priorities corresponding to the media packets, instead of transmitting the media packets in a receiving sequence of the media packets. Because the transmission priority of the QFI 1 is high, the transmission priority of the QFI 2 is medium, and the transmission priority of the QFI 3 is low, the access network element may preferentially transmit the media packet 1, then transmit the media packet 2, and finally transmit the media packet 3.

Optionally, when that the different encoding types correspond to the different QoS flows means that a part of encoding types correspond to one QoS flow, and the other part of encoding types correspond to another QoS flow, the foregoing information associated with the encoding type is described in detail by using an example in which the encoding type includes the I-frame, the P-frame, or the B-frame, a QoS flow corresponding to the I-frame is a QFT 1, and QoS flows corresponding to the P-frame and the B-frame each are a QFI 2.

Based on a decoding dependency, a transmission priority of the QFI 1 corresponding to the I-frame may be set to being high, and a transmission priority of the QFT 2 corresponding to the P-frame and the B-frame may be set to being low. In this way, after receiving media packets and performing the encoding type identification, the transmit end network element may include the QFI 1 in a media packet whose encoding type is the I-frame, and include the QFI 2 in a media packet whose encoding type is the P-frame or the B-frame. Therefore, after receiving the media packets, the access network element transmits, based on the transmission priority corresponding to the QFI 1, the media packet carrying the QFI 1, and transmits, based on the transmission priority corresponding to the QFI 2, the media packet carrying the QFI 2.

For example, the access network element successively receives a media packet 2 carrying the QFI 2 and a media packet 1 carrying the QFI 1. The access network element may transmit the media packets based on transmission priorities corresponding to the media packets, instead of transmitting the media packets in a receiving sequence of the media packets. Because the transmission priority of the QFI 1 is high and the transmission priority of the QFI 2 is low, the access network element may first transmit the media packet 1, and then transmit the media packet 2.

It should be noted that, when the access network element receives a plurality of media packets that carry an identifier of a same QoS flow, for example, when the access network element successively receives a media packet 11 that carry the QFI 1, a media packet 12 that carry the QFI 1, and a media packet 13 that carry the QFI 1, the access network element may transmit the media packets in a receiving sequence of the media packets. That is, the access network element successively transmits the media packet 11, the media packet 12, and the media packet 13 in the receiving sequence.

It should be noted that the transmit end network element may perform identification on a media packet by using the method shown in the foregoing step 303, to obtain an encoding type corresponding to the media packet.

(2) When different encoding types correspond to a same QoS flow, the information associated with the encoding type may be third indication information.

The third indication information indicates the encoding type of the media packet.

When the different encoding types correspond to the same QoS flow, the transmit end network element may perform the encoding layer identification on the media packet to obtain the encoding type of the media packet, and determine the third indication information based on the encoding type of the media packet.

The foregoing information associated with the encoding type is described in detail by using an example in which the encoding type includes the I-frame, the P-frame, or the B-frame and QoS flows corresponding to the I-frame, the P-frame, and the B-frame each are a QFI 1.

When the transmit end network element performs the encoding layer identification on the media packet and obtains that the encoding type of the media packet is the I-frame, the transmit end network element generates the third indication information indicating that the encoding type is the I-frame. Similarly, when the encoding type of the media packet is the P-frame, the transmit end network element generates the third indication information indicating that the encoding type is the P-frame; or when the encoding type of the media packet is the B-frame, the transmit end network element generates the third indication information indicating that the encoding type is the B-frame.

Further, the transmit end network element includes the third indication information in the media packet and sends the media packet to the access network element, so that the access network element performs differentiated transmission based on the encoding type of the media packet. For example, the encoding type includes the I-frame, the P-frame, or the B-frame. Based on a decoding dependency, the access network element may preferentially transmit a media packet Whose encoding type is the I-frame, then a media packet whose encoding type is the P-frame, and finally a media packet whose encoding type is the B-frame. Alternatively, the access network element may preferentially transmit a media packet whose encoding type is the I-frame, and then transmit media packets whose encoding types are the P-frame and the B-frame. Priorities corresponding to the P-frame and the B-frame may be the same, and the like. This is not limited.

Optionally, when the transmit end network element is the user plane network element, the third indication information is located at a general packet radio service tunneling protocol—user plane GTP-U layer of the media packet. When the transmit end network element is the terminal, the third indication information is located at a packet data convergence protocol (PDCP) layer of the media packet.

(3) When different encoding types correspond to a same QoS flow, the information associated with the encoding type may be the second indication information.

The second indication information indicates the encoding type of the media packet.

When the different encoding types correspond to the same QoS flow; the transmit end network element may perform the application layer, transport layer, or network layer identification on the media packet to obtain the second indication information, include the second indication information in the media packet, and send the media packet to the access network element.

The foregoing information associated with the encoding type is described in detail by using an example in which the encoding type includes the I-frame, the P-frame, or the B-frame and QoS flows corresponding to the I-frame, the P-frame, and the B-frame each are a QFT 1.

When the transmit end network element performs the application layer, transport layer, or network layer identification on the media packet and obtains that the second indication information is that the encoding type of the media packet is the T-frame, the transmit end network element includes the second indication information in the media packet, and sends the media packet to the access network element. Therefore, the access network element determines, based on the second indication information in the media packet, that the encoding type of the current media packet is the I-frame. Similarly, when the transmit end network element includes the second indication information indicating that the encoding type of the media packet is the P-frame in the media packet and sends the media packet to the access network element, the access network element may determine, based on the second indication information, that the encoding type of the current media packet is the P-frame; or when the transmit end network element includes the second indication information indicating that the encoding type of the media packet is the B-frame in the media packet and sends the media packet to the access network element, the access network element may determine, based on the second indication information, that the encoding type of the current media packet is the B-frame.

Further, the transmit end network element includes the second indication information in the media packet and sends the media packet to the access network element, so that the access network element performs differentiated transmission based on the encoding type of the media packet. For example, the encoding type includes the I-frame, the P-frame, or the B-frame. Based on a decoding dependency, the access network element may preferentially transmit a media packet whose encoding type is the I-frame, then a media packet whose encoding type is the P-frame, and finally a media packet whose encoding type is the B-frame. Alternatively, the access network element may preferentially transmit a media packet whose encoding type is the I-frame, and then transmit media packets whose encoding types are the P-frame and the B-frame. Priorities corresponding to the P-frame and the B-frame may be the same, and the like. This is not limited.

Optionally, when the transmit end network element is the user plane network element, the second indication information is located at a general packet radio service tunneling protocol—user plane GTP-U layer of the media packet. When the transmit end network element is the terminal, the second indication information is located at a packet data convergence protocol (PDCP) layer of the media packet.

It should be noted that, before sending the media packet to the transmit end network element, the application server may process the media packet, for example, add the encoding type to the application layer, the transport layer, or the network layer of the media packet, so that the transmit end network element may perform the application layer, transport layer, or network layer identification on the received media packet to obtain the encoding type of the media packet. The encoding type indicates an encoding feature of the media packet.

Further, after performing the application layer, transport layer, or network layer identification on the received media packet, the transmit end network element may perform differentiated processing on the media packet based on an identification result.

Optionally, the transmit end network element may perform the differentiated processing on the media packet based on the identification result and different QoS parameters.

For example, the encoding type includes the I-frame, the P-frame, or the B-frame. The transmit end network element may perform high QoS parameter processing on the media packet whose encoding type is the I-frame, and perform low QoS parameter processing on the media packet whose encoding type is the P-frame or the B-frame. The QoS parameter includes a bandwidth, a delay, and the like. A high QoS parameter refers to a high bandwidth and a low delay, and a low QoS parameter refers to a low bandwidth and a high delay. In this case, the transmit end network element needs to receive a correspondence between the encoding type and the QoS parameter from the session management network element.

(4) When different encoding types correspond to a same QoS flow, the information associated with the encoding type may be fourth indication information.

The fourth indication information indicates a priority corresponding to the encoding type of the media packet.

Specifically, different encoding types may correspond to different priorities; or a part of encoding types correspond to one priority and the other part of encoding types correspond to another priority. For example, the encoding type includes the I-frame, the P-frame, or the B-frame. A priority corresponding to the I-frame may be set to being high, priority corresponding to the P-frame may be set to being medium, and a priority corresponding to the B-frame may be set to being low; a priority corresponding to the I-frame may be set to being high, and priorities corresponding to the P-frame and the B-frame may be set to being low; or the like. This is not limited.

Optionally, when the transmit end network element is the user plane network element, the user plane network element receives the encoding type and the priority corresponding to the encoding type that are sent by the session management network element. When the transmit end network element is the terminal, the terminal receives, through the mobility management network element, the encoding type and the priority corresponding to the encoding type that are sent by the session management network element.

When the different encoding types correspond to the same QoS flow, the transmit end network element may perform the encoding layer identification on the media packet to obtain the encoding type of the media packet, and determine the fourth indication information based on the encoding type; or the transmit end network element may perform the application layer, transport layer, or network layer identification on the media packet to obtain the second indication information, and determine the fourth indication information based on the encoding type indicated by the second indication information.

The foregoing information associated with the encoding type is described in detail by using an example in which the encoding type includes the I-frame, the P-frame, or the B-frame, QoS flows corresponding to the I-frame, the P-frame, and the B-frame each are a QFI 1, the priority corresponding to the I-frame is high, the priority corresponding to the P-frame is medium, and the priority corresponding to the B-frame is low.

Optionally, when the transmit end network element performs the encoding layer identification on the media packet and obtains that the encoding type of the media packet is the I-frame, the fourth indication information is determined to have a high priority. Similarly, when the identified encoding type of the media packet is the P-frame, the fourth indication information is determined to have a medium priority; or when the identified encoding type of the media packet is the B-frame, the fourth indication information is determined to have a low priority.

Optionally, when the transmit end network element performs the application layer, transport layer, or network layer identification on the media packet and obtains that the second indication information is that the encoding type of the media packet is the I-frame, the fourth indication information is determined to have a high priority. When the transmit end network element determines that the second indication information is that the encoding type of the media packet is the P-frame, the fourth indication information is determined to have a medium priority. When the transmit end network element determines that the second indication information is that the encoding type of the media packet is the B-frame, the fourth indication information is determined to have a low priority.

Further, the transmit end network element includes the fourth indication information in the media packet and sends the media packet to the access network element, so that the access network element performs differentiated transmission on the media packet based on the priority indicated by the fourth indication information.

Further, after performing the application layer, transport layer, or network layer identification on the received media packet, the transmit end network element may perform differentiated processing on the media packet based on an identification result.

Optionally, the transmit end network element may perform the differentiated processing on the media packet based on the identification result and different QoS parameters.

For example, the encoding type includes the i-frame, the P-frame, or the B-frame. The transmit end network element may perform high QoS parameter processing on the media packet whose encoding type is the I-frame, and perform low QoS parameter processing on the media packet whose encoding type is the P-frame or the B-frame. The QoS parameter includes a bandwidth, a delay, and the like. A high QoS parameter refers to a high bandwidth and a low delay, and a low QoS parameter refers to a low bandwidth and a high delay. In this case, the transmit end network element needs to receive a correspondence between the encoding type and the QoS parameter from the session management network element.

Further, in step 304, the transmit end network element may further include sixth indication information in the media packet and send the media packet to the access network element. The sixth indication information indicates a QoS parameter corresponding to the media packet. The QoS parameter may include one or more of QoS parameters such as a bandwidth, a delay, a packet loss rate, reliability, and a bit error rate. This is not limited.

Step 305: The access network element transmits the media packet.

Specifically, the access network element may send, to the user plane network element corresponding to the PDU session through the PDU session established by the terminal, a media packet sent by the terminal, or the access network element may send, to the terminal, a media packet sent by the user plane network element.

Optionally, when the information associated with the encoding type in the media packet is (1) in the foregoing step 304, the access network element transmits the current media packet based on a QoS flow corresponding to the identifier of the QoS flow in the media packet.

Optionally, when the information associated with the encoding type in the media packet is (2) or (3) in the foregoing step 304, the access network element determines, based on the encoding type indicated by the second indication information or the third indication information in the media packet, a QoS parameter corresponding to the encoding type, and transmits, based on the QoS parameter corresponding to the encoding type, the media packet through a QoS flow corresponding to the encoding type. The QoS parameter may be the delay, the bandwidth, and the like.

Specifically, the access network element may receive the encoding type and the priority corresponding to the encoding type that are sent by the session management network element through the mobility management network element, and perform the differentiated transmission on the received media packet based on the priority corresponding to the encoding type.

Optionally, when the information associated with the encoding type in the media packet is (4) in the foregoing step 304, the access network element transmits the media packet based on the priority in the media packet.

Further, when the media packet received by the access network element includes the sixth indication information, the access network element may further process the media packet based on the sixth indication information.

For example, the access network element receives the media packet that includes the sixth indication information and that is sent by the user plane network element. It is assumed that the sixth indication information indicates that reliability corresponding to the media packet is high reliability. Then, the access network element may transmit the media packet through a high-reliability path between the terminal and the access network element, thereby ensuring the high reliability of the media packet.

Based on the method shown in FIG. 3, in this embodiment of this application, the transmit end network element may perform the encoding type identification on the received media packet of the media service, include the information associated with the encoding type in the media packet, and send the media packet to the access network element through the QoS flow corresponding to the encoding type. Compared with the conventional technology in which a transmit end successively sends media packets to a receive end network element in an arrival sequence of the media packets, in embodiments of this application, the transmit end network element may perform the encoding type identification on the media packet, include the information associated with the encoding type in the media packet, and send the media packet to the access network element, so that the access network element can perform the differentiated transmission on the media packet based on the information associated with the encoding type in the media packet. For example, the encoding type includes the I-frame, the P-frame, or the B-frame. According to the foregoing method shown in FIG. 3, it can be learned that the access network element may preferentially transmit the I-frame, then transmit the P-frame, and finally transmit the B-frame, to implement the differentiated transmission on the media packet. When the receive end network element decodes the media packet, because the access network element preferentially transmits the I-frame, then transmits the P-frame, and finally transmits the B-frame, the I-frame or the P-frame on which the P-frame depends has been transmitted when the receive end network element decodes the P-frame. Therefore, the receive end network element may decode the P-frame just after receiving the P-frame. The I-frame or the P-frame on which the B-frame depends has been transmitted when the receive end network element decodes the B-frame. Therefore, the receive end network element may decode the B-frame just after receiving the B-frame. Compared with the conventional technology in Which after receiving a P-frame or a B-frame, the receive end network element can implement decoding only after transmission of an I-frame or a P-frame on which the P-frame or the B-frame depends is completed, the solution in this embodiment of this application can shorten decoding time of the receive end network element, to shorten time a user waits for buffering when playing the media packet and improve user experience.

Figure 4A:
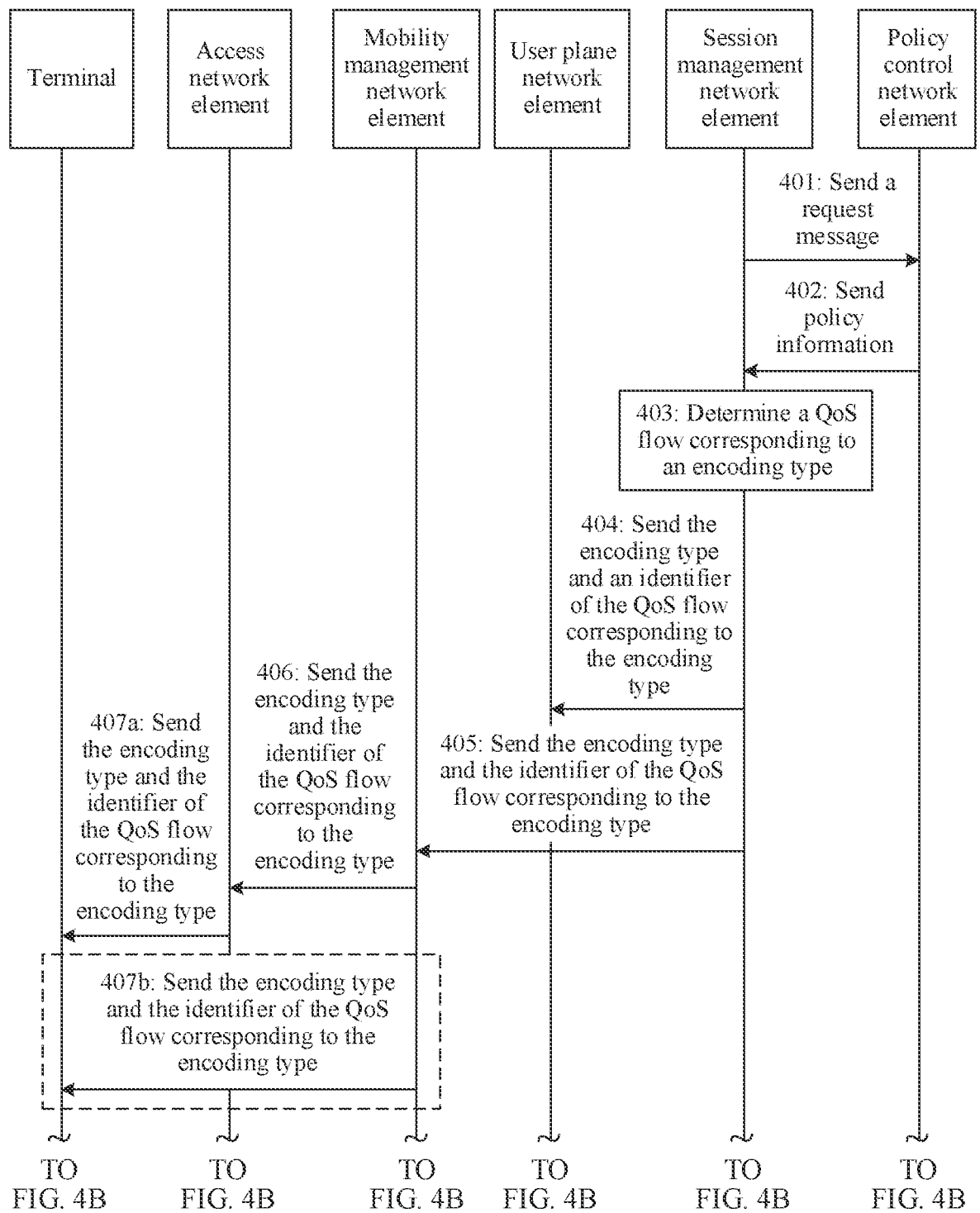
FIG. 4A and FIG. 4B are a flowchart of a media packet transmission method according to an embodiment of this application.
Figure 4B:
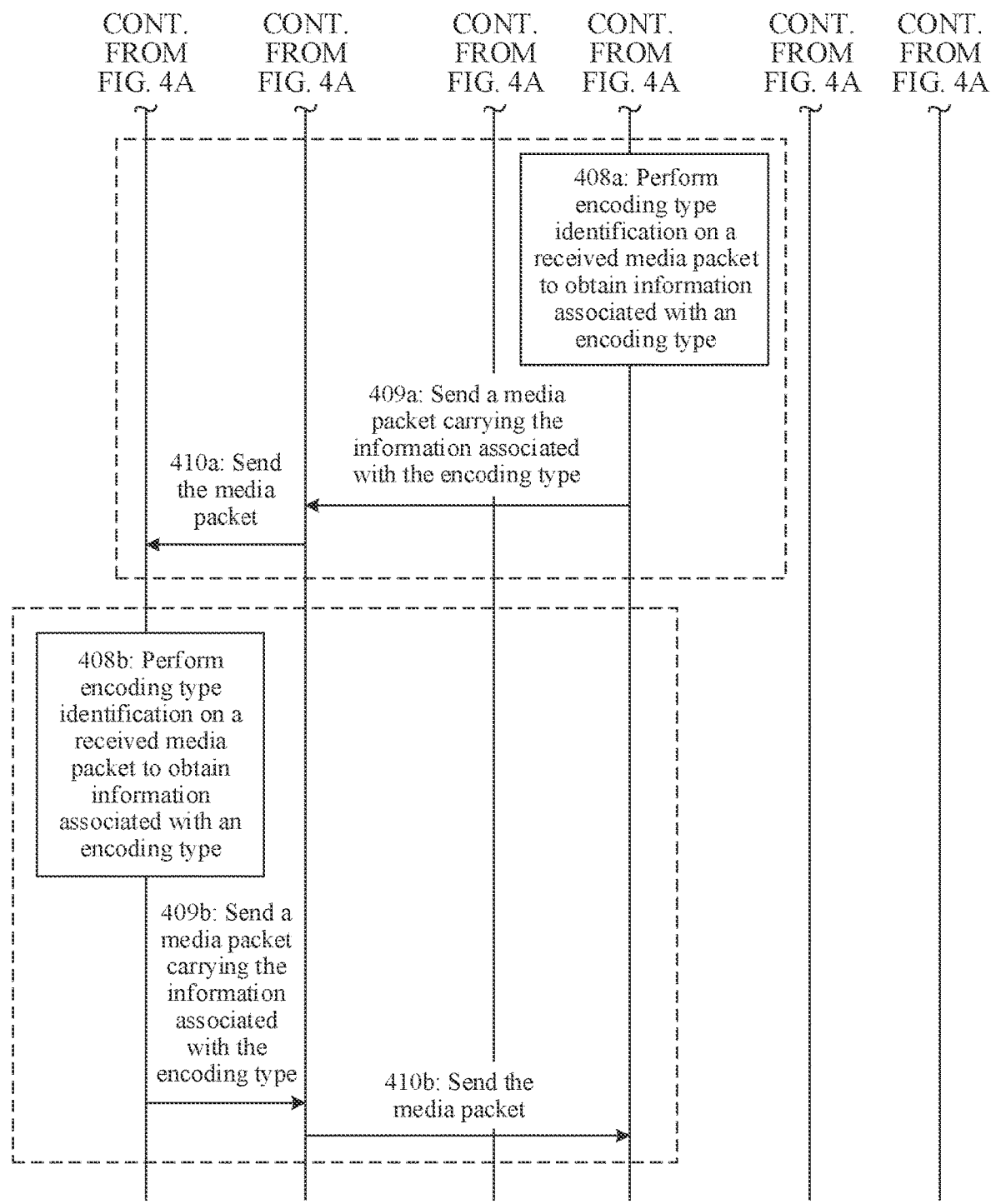

With reference to FIG. 4A and FIG. 4B, the following describes in detail how a transmit end network element obtains a correspondence between an encoding type of a media service and a QoS flow.

FIG. 4A and FIG. 4B show a media packet transmission method according to an embodiment of this application. The method includes the following steps.

Step 401: A session management network element sends a request message to a policy control network element. Correspondingly, the policy control network element receives the request message.

The request message may be used to request to obtain policy information of the media service, and the request message may include a session identifier.

In a possible design, the request message may be a session management policy establishment request (SM policy establishment request). For example, a terminal may send a PDU session establishment request to the session management network element through a mobility management network element, to request to establish a PDU session for the terminal. After receiving the PDU session establishment request, the session management network element sends the SM policy establishment request to the policy control network element.

In another possible design, the request message may be a session management policy modification request (SM policy modification request). For example, the terminal may send, to the session management network element through the mobility management network element, a PDU session modification request that carries identification information of the media service, to request to transmit a media packet of the media service through a PDU session established by the terminal. After receiving the PDU session modification request, the session management network element sends the SM policy modification request to the policy control network element.

Step 402: The policy control network element sends policy information to the session management network element. Correspondingly, the session management network element receives the policy information.

The policy information may be a policy and charging control rule (PCC rule). The policy information includes the identification information of the media service, the encoding type of the media service, and a QoS parameter corresponding to the encoding type. The identification information of the media service indicates the media service, and may specifically be an IP 5-tuple, or may be an IP 3-tuple, an application identifier, or the like.

In a possible design, when the request message is the SM policy establishment request, the policy information may be carried in a session management policy establishment response (SM policy establishment response).

In another possible design, when the request message is the SM policy modification request, the policy information may be carried in a session management policy modification response (SM policy modification response).

Optionally, the policy control network element may receive the encoding type of the media service and a QoS requirement corresponding to the encoding type that are sent by an application function network element, and determine the corresponding QoS parameter for the encoding type based on the QoS requirement corresponding to the encoding type.

Optionally, the policy control network element may receive the identification information of the media service sent by the application function network element.

Different encoding types may correspond to different requirements. Alternatively, a part of encoding types may correspond to one QoS requirement, and the other part of encoding types may correspond to another QoS requirement. Alternatively, all encoding types correspond to a same QoS requirement.

For example, the encoding type includes an I-frame, a P-frame, or a B-frame, the I-frame correspond to a QoS requirement 1, the P-frame may correspond to a QoS requirement 2, and the B-frame may correspond to a QoS requirement 3. Alternatively, the I-frame correspond to a QoS requirement 1, and the P-frame and the B-frame may correspond to a QoS requirement 2. Alternatively, the I-frame, the P-frame, and the B-frame all correspond to a QoS requirement 1.

For example, when the I-frame corresponds to the QoS requirement 1, the P-frame corresponds to the QoS requirement 2, and the B-frame corresponds to the QoS requirement 3, the QoS parameter that is corresponding to the encoding type and that is obtained by the policy control network element may be as follows: The I-frame corresponds to a QoS parameter 1, the P-frame corresponds to a QoS parameter 2, and the B-frame corresponds to a QoS parameter 3.

For example, when the I-frame corresponds to the QoS requirement 1, and the P-frame and the B-frame correspond to the QoS requirement 2, the QoS parameter that is corresponding to the encoding type and that is obtained by the policy control network element may be as follows: The I-frame corresponds to a QoS parameter 1, and the P-frame and the B-frame to a QoS parameter 2.

For example, when the I-frame, the P-frame, and the B-frame all correspond to the QoS requirement 1, the QoS parameter that is corresponding to the encoding type and that is obtained by the policy control network element may be as follows: The I-frame, the P-frame, and the B-frame all correspond to a QoS parameter 1.

Optionally, the policy control network element is preconfigured with the encoding type of the media service and the QoS parameter corresponding to the encoding type.

Further, the policy control network element may further receive fifth indication information sent by the application function network element, and send the fifth indication information to the session management network element, where the fifth indication information indicates to perform encoding type identification on the media packet of the media service.

Optionally, the fifth indication information includes the identification information of the media service, and the identification information indicates the media service.

Step 403: The session management network element determines a QoS flow corresponding to the encoding type based on the identification information of the media service, the encoding type of the media service, and the QoS parameter corresponding to the encoding type that are included in the policy information.

Specifically, the session management network element may create a new QoS flow for the encoding type, or may modify an existing QoS flow to obtain the QoS flow corresponding to the encoding type. This is not limited. That is, the session management network element creates the QoS flow corresponding to the encoding type. When different encoding types correspond to different QoS flows, the session management network element needs to create different QoS flows.

For example, the encoding type includes the I-frame, the P-frame, or the B-frame. When the I-frame corresponds to the QoS parameter 1, the P-frame corresponds to the QoS parameter 2, and the B-frame corresponds to the QoS parameter 3, the session management network element may determine a QoS flow 1 for the I-frame, determine a QoS flow 2 for the P-frame, and determine a QoS flow 3 for the B-frame. That is, the QoS flow corresponding to the encoding type may be as follows: The I-frame corresponds to the QoS flow 1, the P-frame corresponds to the QoS flow 2, and the B-frame corresponds to the QoS flow 3.

Similarly, when the I-frame corresponds to the QoS parameter 1, and the P-frame and the B-frame correspond to the QoS parameter 2, the QoS flow corresponding to the encoding type may be as follows: The I-frame corresponds to a QoS flow 1, and the P-frame and the B-frame correspond to a QoS flow 2. When the I-frame, the P-frame, and the B-frame all correspond to the QoS parameter 1, the QoS flow corresponding to the encoding type may be as follows: The I-frame, the P-frame, and the B-frame all correspond to a QoS flow 1.

Step 404: The session management network element sends the encoding type and an identifier of the QoS flow corresponding to the encoding type to a user plane network element. Correspondingly, the user plane network element receives the encoding type and the identifier of the QoS flow corresponding to the encoding type.

Further, the session management network element receives the fifth indication information sent by the policy control network element, and sends first indication information to the user plane network element based on the fifth indication information, where the first indication information indicates to perform encoding layer identification on the media packet of the media service.

Further, the session management network element may further determine a priority corresponding to the encoding type based on the encoding type, and send the priority corresponding to the encoding type to the user plane network element. In this case, the session management network element sends the priority corresponding to the encoding and an identifier of a QoS flow corresponding to the priority to the user plane network element.

The session management network element may determine, based on a decoding dependency between encoding types, the priority corresponding to the encoding type.

In a possible design, the session management network element sends N4 configuration information to the user plane network element, and correspondingly, the user plane network element receives the N4 configuration information.

The N4 configuration information may be an N4 session establishment request message or an N4 session modification message. The N4 configuration information may include the correspondence between the encoding type and the QoS flow, and may further include some existing information, for example, a processing policy corresponding to the media service, a packet detection rule (PDR), a forwarding action rule (FAR) associated with the PDR, and a quality of service flow (QoS flow, QF) mapping rule. This is not limited. For related descriptions of the information, refer to a conventional technology. Details are not described.

Step 405: The session management network element sends the encoding type and the identifier of the QoS flow corresponding to the encoding type to the mobility management network element. Correspondingly, the mobility management network element receives the encoding type and the identifier of the QoS flow corresponding to the encoding type.

Further, the session management network element receives the fifth indication information sent by the policy control network element, and sends the first indication information to the mobility management network element based on the fifth indication information, where the first indication information indicates to perform the encoding layer identification on the media packet of the media service.

Further, the session management network element may further determine the priority corresponding to the encoding type based on the encoding type, and send the priority corresponding to the encoding type to the mobility management network element. In this case, the session management network element sends the priority corresponding to the encoding and the identifier of the QoS flow corresponding to the priority to the mobility management network elemen.

The session management network element may determine, based on the decoding dependency between the encoding types, the priority corresponding to the encoding type.

It should be noted that there is no sequence for performing step 404 and step 405. Step 404 and step 405 may be performed at the same time, step 404 may be performed before step 405, or step 405 is performed before step 404, or the like. This is not limited.

Step 406: The mobility management network element sends the encoding type and the identifier of the QoS flow corresponding to the encoding type to an access network element. Correspondingly, the access network element receives the encoding type and the identifier of the QoS flow corresponding to the encoding type.

Optionally, the mobility management network element receives the priority that is corresponding to the encoding type and that is sent by the session management network element, and sends the priority corresponding to the encoding type to the access network element.

Optionally, the mobility management network element receives the first indication information sent by the session management network element, and sends the first indication information to the access network element.

Step 407*a*: The access network element sends the encoding type and the identifier of the QoS flow corresponding to the encoding type to the terminal. Correspondingly, the terminal receives the encoding type and the identifier of the QoS flow corresponding to the encoding type.

Optionally, the access network element sends the first indication information to the terminal.

Optionally, the access network element sends the priority corresponding to the encoding type to the terminal.

Alternatively, the foregoing step 407*a* may be replaced with the following step 407*b*.

Step 407*b*: The mobility management network element sends the encoding type and the identifier of the QoS flow corresponding to the encoding type to the terminal. Correspondingly, the terminal receives the encoding type and the identifier of the QoS flow corresponding to the encoding type.

Optionally, the mobility management network element sends the first indication information to the terminal.

Optionally, the mobility management network element sends the priority corresponding to the encoding type to the terminal.

Step 408*a*: The user plane network element receives a media packet, and performs the encoding type identification on the media packet to obtain information associated with an encoding type.

Specifically, the user plane network element may perform the encoding type identification on the media packet in the manner in the foregoing step 303, and include the information associated with the encoding type in the media packet according to the foregoing step 304.

Step 409a: The user plane network element includes the information associated with the encoding type in the media packet and sends the media packet to the access network element. Correspondingly, the access network element receives the media packet.

Step 410a: The access network element sends the media packet to the terminal based on the information associated with the encoding type in the media packet. Correspondingly, the terminal receives the media packet.

Specifically, when receiving the media packet, the access network element may send the media packet to the terminal according to the method in the foregoing step 305.

Step 408b: The terminal receives a media packet, and performs the encoding type identification on the media packet to obtain information associated with an encoding type.

Specifically, the terminal may perform the encoding type identification on the media packet in the manner in the foregoing step 303, and include the information associated with the encoding type in the media packet according to the foregoing step 304.

Step 409b: The terminal includes the information associated with the encoding type in the media packet and sends the media packet to the access network element. Correspondingly, the access network element receives the media packet.

Step 410b: The access network element sends the media packet to the user plane network element based on the information associated with the encoding type in the media packet. Correspondingly, the user plane network element receives the media packet.

Specifically, when receiving the media packet, the access network element may send the media packet to the user plane network element according to the method in the foregoing step 305.

Further, the user plane network element may send, to an application server, the media packet sent by the access network element.

Figure 5:
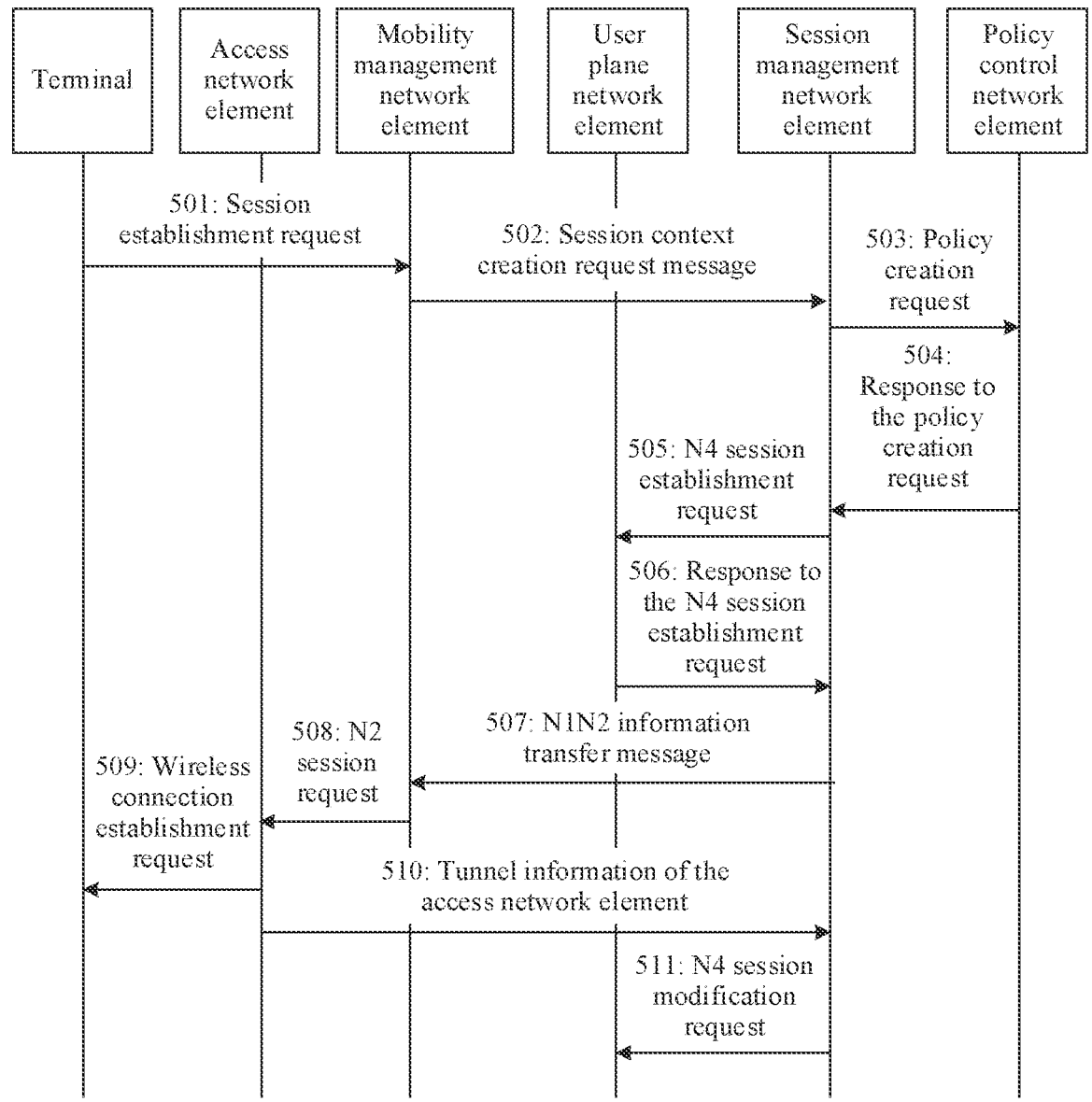
FIG. 5 is a flowchart of a media packet transmission method according to an embodiment of this application.

It should be noted that the method shown in FIG. 4A and FIG. 4B may occur after the terminal establishes the PDU session. That is, after the terminal establishes the PDU session, step 401 to step 410a are performed, or step 401 to step 410b are performed. The method shown in FIG. 4A and FIG. 4B may alternatively occur in a process in which the terminal establishes the PDU session. As shown in FIG. 5, FIG. 5 is a flowchart of a media packet transmission method according to an embodiment of this application. The method includes the following steps.

Step 501: A terminal sends a session establishment request to a mobility management network element through an access network element. In response, the mobility management network element receives the session establishment request.

The session establishment request is used to request to establish a PDU session corresponding to the terminal.

Optionally, the terminal further sends a session identifier to the mobility management network element through the access network element, where the session identifier identifies a session.

Optionally, the session establishment request and the session identifier are carried in a non-access stratum message (NAS message) to be sent to the mobility management network element.

Step 502: The mobility management network element sends a session context creation request message to a session management network element. Correspondingly, the session management network element receives the session context creation request message.

The session context creation request message may include a terminal identifier, the session identifier, and the session establishment request.

Step 503: The session management network element sends a policy creation request to a policy control network element. Correspondingly, the policy control network element receives the policy creation request.

The policy creation request may include the terminal identifier and the session identifier.

Step 504: The policy control network element sends a response to the policy creation request to the session management network element. Correspondingly, the session management network element receives the response to the policy creation request.

The response to the policy creation request includes identification information of a media service, an encoding type of the media service, and a QoS parameter corresponding to the encoding type. The QoS parameter may be a bandwidth, a delay, and the like.

Optionally, the response to the policy creation request includes a priority corresponding to the encoding type and a QoS parameter corresponding to the priority.

Optionally, the response to the policy creation request further includes the fifth indication information shown in step 401.

Step 505: The session management network element sends an N4 session establishment request to a user plane network element. Correspondingly, the user plane network element receives the N4 session establishment request.

The N4 session establishment request includes the encoding type and an identifier of a QoS flow corresponding to the encoding type.

Optionally, the N4 session establishment request further includes first indication information.

Optionally, the N4 session establishment request further includes the priority corresponding to the encoding type and an identifier of a QoS flow corresponding to the priority.

Step 506: The user plane network element sends a response to the N4 session establishment request to the session management network element. Correspondingly, the session management network element receives the response to the N4 session establishment request.

The response to the N4 session establishment request includes tunnel information of the user plane network element.

Step 507: The session management network element sends an N1N2 information transfer message to the mobility management network element. Correspondingly, the mobility management network element receives the N1N2 information transfer message.

The N1N2 information transfer message includes the session identifier, the tunnel information of the user plane network element, and session establishment acceptance information. The session establishment acceptance information indicates to accept the session establishment request sent by the terminal.

Optionally, the N1N2 information transfer message further includes the encoding type and the identifier of the QoS flow corresponding to the encoding type.

Optionally, the N1N2 information transfer message further includes the first indication information.

Optionally, the N1N2 information transfer message further includes the priority corresponding to the encoding type and the identifier of the QoS flow corresponding to the priority.

Step 508: The mobility management network element sends an N2 session request to the access network element. Correspondingly, the access network element receives the N2 session request.

The N2 session request includes the session identifier, the tunnel information of the user plane network element, and the session establishment acceptance information.

Optionally, the N2 session request further includes the encoding type and the identifier of the QoS flow corresponding to the encoding type.

Optionally, the N2 session request further includes the first indication information.

Optionally, the N2 session request further includes the priority corresponding to the encoding type and the identifier of the QoS flow corresponding to the priority.

Step 509: The access network element sends a wireless connection establishment request to the terminal. Correspondingly, the terminal receives the wireless connection establishment request.

The wireless connection establishment request includes the session establishment acceptance information, the encoding type and the identifier of the QoS flow corresponding to the encoding type. Optionally, the encoding type and the identifier of the QoS flow corresponding to the encoding type may be included in the session establishment acceptation message.

Optionally, the wireless connection establishment request further includes the first indication information and/or the priority corresponding to the encoding type. Alternatively, optionally, the session establishment acceptance message includes the first indication information and/or the priority corresponding to the encoding type.

Step 510: The access network element sends tunnel information of the access network element to the session management network element through the mobility management network element. Correspondingly, the session management network element receives the tunnel information of the access network element.

Step 511: The session management network element sends an N4 session modification request to the user plane network element. Correspondingly, the user plane network element receives the N4 session modification request.

The N4 session modification request includes the tunnel information of the access network element.

The session management network element sends the tunnel information of the access network element to the user plane network element and sends the tunnel information of the user plane network element to the access network element, so that the access network element establishes a connection to the user plane network element to complete a PDI; session establishment procedure.

Alternatively, the encoding type in FIG. 3, FIG. 4A, FIG. 4B, and FIG. 5 is replaced with a service type.

The service type may refer to a service type of a media service. For example, the service type of the media service may include a game service type, an animation service type, and the like. This is not limited.

In embodiments of this application, the transmit end network element may obtain a correspondence between the service type and the QoS flow in a manner similar to that in the foregoing step 301. When the transmit end network element receives the media packet of the media service, the transmit end network element may identify a service type of the media packet in a manner similar to that in the foregoing step 303, and send, through a QoS flow corresponding to the service type of the media packet and in a manner similar to that in the foregoing step 304, based on the correspondence between the service type and the QoS flow, a media packet carrying information associated with the service type of the media packet to the access network element. The access network element may transmit the received media packet in a manner similar to that in the foregoing step 305.

In embodiments of this application, the transmit end network element may perform service type identification on the received media packet, include the information associated with the service type in the media packet, and send the media packet to the access network element, so that the access network element can perform the differentiated transmission on the media packet based on the information associated with the service type in the media packet. For example, in an example in which the service type of the media service includes the game service type and the animation service type, the differentiated transmission may be performed on the media packet based on a QoS requirement corresponding to the service type. For example, a media packet of the game service type is preferentially transmitted, and then a media packet of the animation service type is transmitted. Based on the information associated with the service type in the media packet, the access network element may preferentially transmit the media packet whose service type is the game service type, and then transmit the media packet whose service type is the animation service type. Therefore, the differentiated transmission of the media packet is implemented, the time the user waits for buffering when playing the media packet is shortened, and user experience is improved.

The foregoing mainly describes the solutions provided in embodiments of this application from the perspective of interaction between the devices. It may be understood that to implement the foregoing functions, the devices include hardware structures and/or software modules corresponding to the functions. A person skilled in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, various network elements may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely logical function division. During actual implementation, another division manner may be used.

Figure 6:
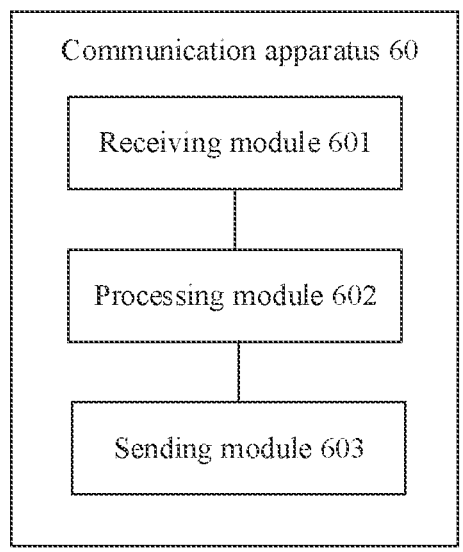
FIG. 6 is a schematic diagram of composition of a communication apparatus according to an embodiment of this application.

When each functional module is obtained through division based on each corresponding function, FIG. 6 shows a communication apparatus. The communication apparatus 60 may be a transmit end network element, or a chip or a system on chip in the transmit end network element. The communication apparatus 60 may be configured to perform a function of the transmit end network element in the foregoing embodiments. The communication apparatus 60 shown in FIG. 6 includes a receiving module 601, a processing module 602, and a sending module 603.

The receiving module 601 is configured to obtain a correspondence between an encoding type and a QoS flow, where the transmit end network element is a user plane network element or a terminal, and the QoS flow is used to transmit a media packet whose encoding type is the encoding type corresponding to the QoS flow.

The receiving module 601 is further configured to receive a media packet of a media service.

The processing module is configured to identify an encoding type of the media packet.

The sending module 603 is configured to send, based on the correspondence through a QoS flow corresponding to the encoding type of the media packet, the media packet carrying information associated with the encoding type to an access network element.

For a specific implementation of the communication apparatus 60, refer to a behavior function of the transmit end network element in the media packet transmission methods in FIG. 3 to FIG. 5.

In a possible design, the receiving module 601 is further configured to receive first indication information that indicates to perform encoding type identification on the media packet of the media service, and the processing module is further configured to identify the encoding type of the media packet based on the first indication information.

In a possible design, the encoding type includes an I-frame, a P-frame, or a B-frame and/or the encoding type includes a base layer or an enhancement layer.

In a possible design, the processing module is further configured to perform encoding layer identification on the media packet to obtain the encoding type of the media packet; the processing module is further configured to perform application layer identification on the media packet to obtain second indication information that indicates the encoding type of the media packet; the processing module is further configured to perform transport layer identification on the media packet to obtain second indication information that indicates the encoding type of the media packet; or the processing module is further configured to perform network layer identification on the media packet to obtain second indication information that indicates the encoding type of the media packet.

In a possible design, when different encoding types correspond to different QoS flows, the information associated with the encoding type includes an identifier of the QoS flow corresponding to the encoding type when the transmit end network element performs the encoding layer identification on the media packet; or the information associated with the encoding type includes an identifier of a QoS flow corresponding to the encoding type indicated by the second indication information when the transmit end network element performs the application layer/transport layer/network layer identification on the media packet.

In a possible design, when different encoding types correspond to a same QoS flow, the information associated with the encoding type includes third indication information that indicates the encoding type of the media packet when the transmit end network element performs the encoding layer identification on the media packet; or the information associated with the encoding type includes the second indication information when the transmit end network element performs the application layer/transport layer/network layer identification on the media packet.

In a possible design, the third indication information is located at a GTP-U layer or a PDCP layer of the media packet.

In a possible design, when different encoding types correspond to a same QoS flow, the information associated with the encoding type includes fourth indication information that indicates a priority corresponding to the encoding type of the media packet when the transmit end network element performs the encoding layer identification on the media packet; or the information associated with the encoding type includes fourth indication information associated with the second indication information when the transmit end network element performs the application layer/transport layer/network layer identification on the media packet, where the fourth indication information indicates a priority corresponding to the encoding type of the media packet.

In a possible design, the receiving module 601 is further configured to receive the priority corresponding to the encoding type, and the processing module is further configured to determine the fourth indication information based on the encoding type of the media packet.

In another possible implementation, the receiving module 601 and the sending module 603 in FIG. 6 may be replaced with a transceiver. Functions of the receiving module 601 and the sending module 603 may be integrated into the transceiver. The processing module 602 may be replaced with a processor, and a function of the processing module 602 may be integrated into the processor. Further, the communication apparatus 60 shown in FIG. 6 may further include a memory. When the receiving module 601 and the sending module 603 are replaced with the transceiver, and the processing module 602 is replaced with the processor, the communication apparatus 60 in this embodiment of this application may be the communication apparatus shown in FIG. 2.

Figure 7:
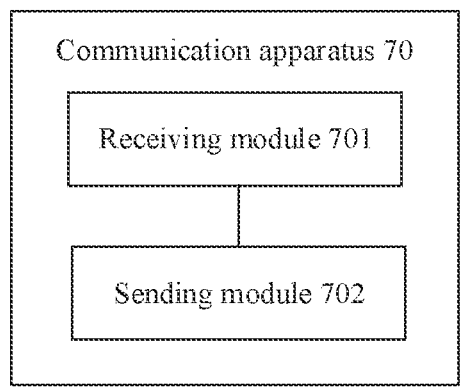
FIG. 7 is a schematic diagram of composition of a communication apparatus according to an embodiment of this application.

When each functional module is obtained through division based on each corresponding function, FIG. 7 shows a communication apparatus. The communication apparatus 70 may be a session management network element, or a chip or a system on chip in the session management network element. The communication apparatus 70 may be configured to perform a function of the session management network element in the foregoing embodiments. The communication apparatus 70 shown in FIG. 7 includes a receiving module 701 and a sending module 702.

The receiving module 701 is configured to receive an encoding type and a quality of service (QoS) parameter corresponding to the encoding type from a policy control network element.

The sending module 702 is configured to send the encoding type and an identifier of a quality of service (QoS) flow corresponding to the encoding type to a mobility management network element and/or a user plane network element based on the encoding type and the QoS parameter corresponding to the encoding type, where the identifier of the QoS flow identifies the QoS flow, and the QoS flow is used to transmit a media packet of a media service.

For a specific implementation of the communication apparatus 70, refer to a behavior function of the session management network element in the media packet transmission methods in FIG. 3 to FIG. 5.

In a possible design, the sending module 702 is further configured to send first indication information that indicates to perform encoding type identification on the media packet of the media service to the mobility management network element and/or the user plane network element.

In a possible design, the sending module 702 is further configured to send a priority corresponding to the encoding type to the mobility management network element and/or the user plane network element.

In another possible implementation, the receiving module 701 and the sending module 702 in FIG. 7 may be replaced with a transceiver, and functions of the receiving module 701 and the sending module 702 may be integrated into the transceiver. Further, the communication apparatus 70 shown in FIG. 7 may further include a memory. When the receiving module 701 and the sending module 702 are replaced with the transceiver, the communication apparatus 70 in this embodiment of this application may be the communication apparatus shown in FIG. 2.

Embodiments of this application further provide a computer-readable storage medium. All or a part of the procedures in the foregoing method embodiments may be completed by a computer program instructing related hardware. The program may be stored in the computer-readable storage medium. When the program is executed, the procedures of the foregoing method embodiments may be included. The computer-readable storage medium may be an internal storage unit of the terminal (including a data transmit end and/or a data receive end) in any one of the foregoing embodiments, for example, a hard disk drive or a memory of the terminal. Alternatively, the computer-readable storage medium may be an external storage device of the terminal, for example, a plug-in hard disk, a smart media card (SMC), a secure digital (SD) card, a flash card, or the like that are configured on the terminal. Further, the computer-readable storage medium may alternatively include both the internal storage unit of the terminal and the external storage device. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this application, terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects and indicates that there may be three relationships. For example, "A and/or B" may indicate that only A exists, only B exists, and both A and B exist, where A and B may be singular or plural.

The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural.

Based on the foregoing descriptions of the implementations, a person skilled in the art may clearly understand that for the purpose of convenient and brief description, division of the foregoing functional modules is used as an example for illustration. In actual application, the foregoing functions can be allocated to different functional modules for implementation based on a requirement. That is, an inner structure of an apparatus is divided into different functional modules to implement all or a part of the functions described above.

In the several embodiments provided in this application, it should be understood that the disclosed apparatus and method may be implemented in other manners. For example, the described apparatus embodiment is merely an example. For example, division into the modules or units is merely logical function division. There may be another division manner during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may be one or more physical units, that is, may be located in one place, or may be distributed on a plurality of different places part or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the conventional technology, or all or a part of the technical solutions may be implemented in a form of a software product. The software product is stored in a storage medium and includes several instructions for instructing a device (which may be a single-chip microcomputer, a chip, or the like) or a processor to perform all or a part of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A media packet transmission method, comprising:
obtaining, by a transmit end network element, a correspondence between a respective encoding type and a respective quality of service (QOS) flow, wherein the transmit end network element is a user plane network element or a terminal, and the respective QoS flow is used to transmit a respective media packet that has the respective encoding type corresponding to the respective QoS flow;

receiving, by the transmit end network element, a plurality of media packets of a media service;

identifying, by the transmit end network element, an encoding type of each media packet of the plurality of media packets; and sending, by the transmit end network element, the plurality of media packets to an access network element based on the correspondence through a respective QoS flow corresponding to a respective encoding type of each media packet of the plurality of media packets, wherein each media packet carries information associated with the respective encoding type, and a transmission sequence of the plurality of media packets is determined based on the respective encoding type of each media packet of the plurality of media packets.

2. The method according to claim 1, wherein the identifying, by the transmit end network element, an encoding type of each media packet of the plurality of media packets comprises:

receiving, by the transmit end network element, first indication information, wherein the first indication information indicates to perform encoding type identification on the media packet of the media service; and identifying, by the transmit end network element, the encoding type of the media packet based on the first indication information.

3. The method according to claim 1, wherein one or more following conditions are true:

the encoding type comprises an I-frame, a P-frame, or a B-frame; or the encoding type comprises a base layer or an enhancement layer; or the encoding type comprises a foreground stream or a background stream; or the encoding type comprises a P-frame, a G-frame, or an altref frame.

4. The method according to claim 1, wherein the identifying, by the transmit end network element, an encoding type of each media packet of the plurality of media packets comprises:

performing, by the transmit end network element, encoding layer identification on the media packet to obtain the encoding type of the media packet;

performing, by the transmit end network element, application layer identification on the media packet to obtain second indication information, wherein the second indication information indicates the encoding type of the media packet;

performing, by the transmit end network element, transport layer identification on the media packet to obtain second indication information, wherein the second indication information indicates the encoding type of the media packet; or performing, by the transmit end network element, network layer identification on the media packet to obtain second indication information, wherein the second indication information indicates the encoding type of the media packet.

5. The method according to claim 4, wherein different encoding types correspond to different QoS flows, and the method comprises:

the information associated with the encoding type comprises an identifier of the QoS flow corresponding to the encoding type when the transmit end network element performs the encoding layer identification on the media packet; or the information associated with the encoding type comprises an identifier of a QoS flow corresponding to the encoding type indicated by the second indication information when the transmit end network element performs the application layer/transport layer/network layer identification on the media packet.

6. The method according to claim 4, wherein different encoding types correspond to a same QoS flow, and the method comprises:

the information associated with the encoding type comprises third indication information when the transmit end network element performs the encoding layer identification on the media packet, wherein the third indication information indicates the encoding type of the media packet; or the information associated with the encoding type comprises the second indication information when the transmit end network element performs the application layer/transport layer/network layer identification on the media packet.

7. The method according to claim 6, wherein the third indication information is located at a general packet radio service tunneling protocol-user plane (GTP-U) layer or a packet data convergence protocol (PDCP) layer of the media packet.

8. The method according to claim 4, wherein different encoding types correspond to a same QoS flow, and the method comprises:

the information associated with the encoding type comprises fourth indication information when the transmit end network element performs the encoding layer identification on the media packet, wherein the fourth indication information indicates a priority corresponding to the encoding type of the media packet; or the information associated with the encoding type comprises fourth indication information associated with the second indication information when the transmit end network element performs the application layer/transport layer/network layer identification on the media packet, wherein the fourth indication information indicates a priority corresponding to the encoding type of the media packet.

9. The method according to claim 8, further comprising:

receiving, by the transmit end network element, the priority corresponding to the encoding type; and determining, by the transmit end network element, the fourth indication information based on the encoding type of the media packet.

10. A media packet transmission method, comprising:

receiving, by a session management network element, an encoding type and a quality of service (QOS) parameter corresponding to the encoding type from a policy control network element; and sending, by the session management network element, the encoding type and an identifier of a quality of service (QOS) flow corresponding to the encoding type to at least one of a mobility management network element or a user plane network element based on the encoding type and the QoS parameter corresponding to the encoding type, wherein the identifier of the QoS flow identifies the QoS flow, the QoS flow is used to transmit a plurality of media packets of a media service, and a transmission sequence of the plurality of media packets is determined based on a respective encoding type of each media packet of the plurality of media packets.

11. The method according to claim 10, wherein the method further comprises:
sending, by the session management network element, first indication information to at least one of the mobility management network element or the user plane network element, wherein the first indication information indicates to perform encoding type identification on each media packet of the plurality of media packets of the media service.

12. The method according to claim 10, wherein the method further comprises:
sending, by the session management network element, a priority corresponding to the encoding type to at least one of the mobility management network element or the user plane network element.

13. A communication apparatus, wherein the communication apparatus comprises one or more processors and a transceiver, and the one or more processors and the transceiver support the communication apparatus in performing a media packet transmission method comprising:
obtaining, by the communication apparatus, a correspondence between a respective encoding type and a respective quality of service (QOS) flow, wherein the respective QoS flow is used to transmit a respective media packet that has the respective encoding type corresponding to the respective QoS flow;
receiving, by the communication apparatus, a plurality of media packets of a media service;
identifying, by the communication apparatus, an encoding type of each media packet of the plurality of media packets; and
sending, by the communication apparatus, the plurality of media packets to an access network element based on the correspondence through a respective QoS flow corresponding to a respective encoding type of each media packet of the plurality of media packets, wherein each media packet carries information associated with the respective encoding type, and a transmission sequence of the plurality of media packets is determined based on the respective encoding type of each media packet of the plurality of media packets.

14. The communication apparatus according to claim 13, wherein the identifying, by the communication apparatus, an encoding type of each media packet of the plurality of media packets comprises:
receiving, by the communication apparatus, first indication information, wherein the first indication information indicates to perform encoding type identification on the media packet of the media service; and
identifying, by the communication apparatus, the encoding type of the media packet based on the first indication information.

15. The communication apparatus according to claim 13, wherein one or more following conditions are true:
the encoding type comprises an I-frame, a P-frame, or a B-frame; or
the encoding type comprises a base layer or an enhancement layer; or
the encoding type comprises a foreground stream or a background stream; or
the encoding type comprises a P-frame, a G-frame, or an altref frame.

16. The communication apparatus according to claim 13, wherein the identifying, by the communication apparatus, an encoding type of each media packet of the plurality of media packets comprises:
performing, by the communication apparatus, encoding layer identification on the media packet to obtain the encoding type of the media packet;
performing, by the communication apparatus, application layer identification on the media packet to obtain second indication information, wherein the second indication information indicates the encoding type of the media packet;
performing, by the communication apparatus, transport layer identification on the media packet to obtain second indication information, wherein the second indication information indicates the encoding type of the media packet; or
performing, by the communication apparatus, network layer identification on the media packet to obtain second indication information, wherein the second indication information indicates the encoding type of the media packet.

17. The communication apparatus according to claim 16, wherein different encoding types correspond to different QoS flows, and the method comprises:
the information associated with the encoding type comprises an identifier of the QoS flow corresponding to the encoding type when the communication apparatus performs the encoding layer identification on the media packet; or
the information associated with the encoding type comprises an identifier of a QoS flow corresponding to the encoding type indicated by the second indication information when the communication apparatus performs the application layer/transport layer/network layer identification on the media packet.

18. The communication apparatus according to claim 16, wherein different encoding types correspond to a same QoS flow, and the method comprises:
the information associated with the encoding type comprises third indication information when the communication apparatus performs the encoding layer identification on the media packet, wherein the third indication information indicates the encoding type of the media packet; or
the information associated with the encoding type comprises the second indication information when the communication apparatus performs the application layer/transport layer/network layer identification on the media packet.

19. The communication apparatus according to claim 16, wherein different encoding types correspond to a same QoS flow, and the method comprises:
the information associated with the encoding type comprises fourth indication information when the communication apparatus performs the encoding layer identification on the media packet, wherein the fourth indication information indicates a priority corresponding to the encoding type of the media packet; or
the information associated with the encoding type comprises fourth indication information associated with the second indication information when the communication apparatus performs the application layer/transport layer/network layer identification on the media packet, wherein the fourth indication information indicates a priority corresponding to the encoding type of the media packet.

20. The communication apparatus according to claim 19, wherein the method further comprises:
   receiving, by the communication apparatus, the priority corresponding to the encoding type; and
   determining, by the communication apparatus, the fourth indication information based on the encoding type of the media packet.

* * * * *

UNITED STATES PATENT AND TRADEMARK OFFICE
CERTIFICATE OF CORRECTION

PATENT NO. : 12,395,540 B2  
APPLICATION NO. : 17/970891  
DATED : August 19, 2025  
INVENTOR(S) : Yongcui Li et al.

Page 1 of 1

It is certified that error appears in the above-identified patent and that said Letters Patent is hereby corrected as shown below:

On the Title Page

In Column 2 (item (56) Other Publications), In Line 1, delete "8rd" and insert -- 3rd --.

In the Claims

In Column 40, In Line 65, In Claim 1, delete "(QOS)" and insert -- (QoS) --.

In Column 42, In Line 55, In Claim 10, delete "(QOS)" and insert -- (QoS) --.

In Column 42, In Line 60, In Claim 10, delete "(QOS)" and insert -- (QoS) --.

In Column 43, In Line 26, In Claim 13, delete "(QOS)" and insert -- (QoS) --.

Signed and Sealed this  
Twenty-third Day of December, 2025

John A. Squires  
*Director of the United States Patent and Trademark Office*